(12) United States Patent
Larosa et al.

(10) Patent No.: US 6,757,219 B2
(45) Date of Patent: Jun. 29, 2004

(54) RASTER BASED SYSTEM AND METHOD FOR TARGET TRACKING AND MOTION ANALYSIS

(75) Inventors: Victor P. Larosa, Cicero, NY (US); Charles G. Muniak, Syracuse, NY (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 10/627,084

(22) Filed: Jul. 25, 2003

(65) Prior Publication Data

US 2004/0090864 A1 May 13, 2004

Related U.S. Application Data

(60) Provisional application No. 60/399,820, filed on Jul. 31, 2002.

(51) Int. Cl.[7] .................................................. G01S 3/80
(52) U.S. Cl. ........................................................ 367/124
(58) Field of Search ................................. 367/124, 125, 367/127, 135

(56) References Cited

U.S. PATENT DOCUMENTS

| | | | | |
|---|---|---|---|---|
| 5,144,595 A | * | 9/1992 | Graham et al. | 367/135 |
| 5,877,998 A | * | 3/1999 | Aidala et al. | 367/124 |
| 6,532,191 B2 | * | 3/2003 | LaRosa et al. | 367/124 |

* cited by examiner

*Primary Examiner*—Daniel Pihulic
(74) *Attorney, Agent, or Firm*—Duane Morris LLP

(57) ABSTRACT

A system and method for determining target solutions based on energy received at one or more sensors includes the step of displaying the received energy on a display. Target solution traces are overlaid onto the received energy trace. The operator selects tie-down points, and adjusts at least one of time, range, and bearing definitions for the tie-down points while observing the overlain traces, so as to obtain coincidence of the traces. The calculated target solution then matches the observed received energy trace.

4 Claims, 24 Drawing Sheets

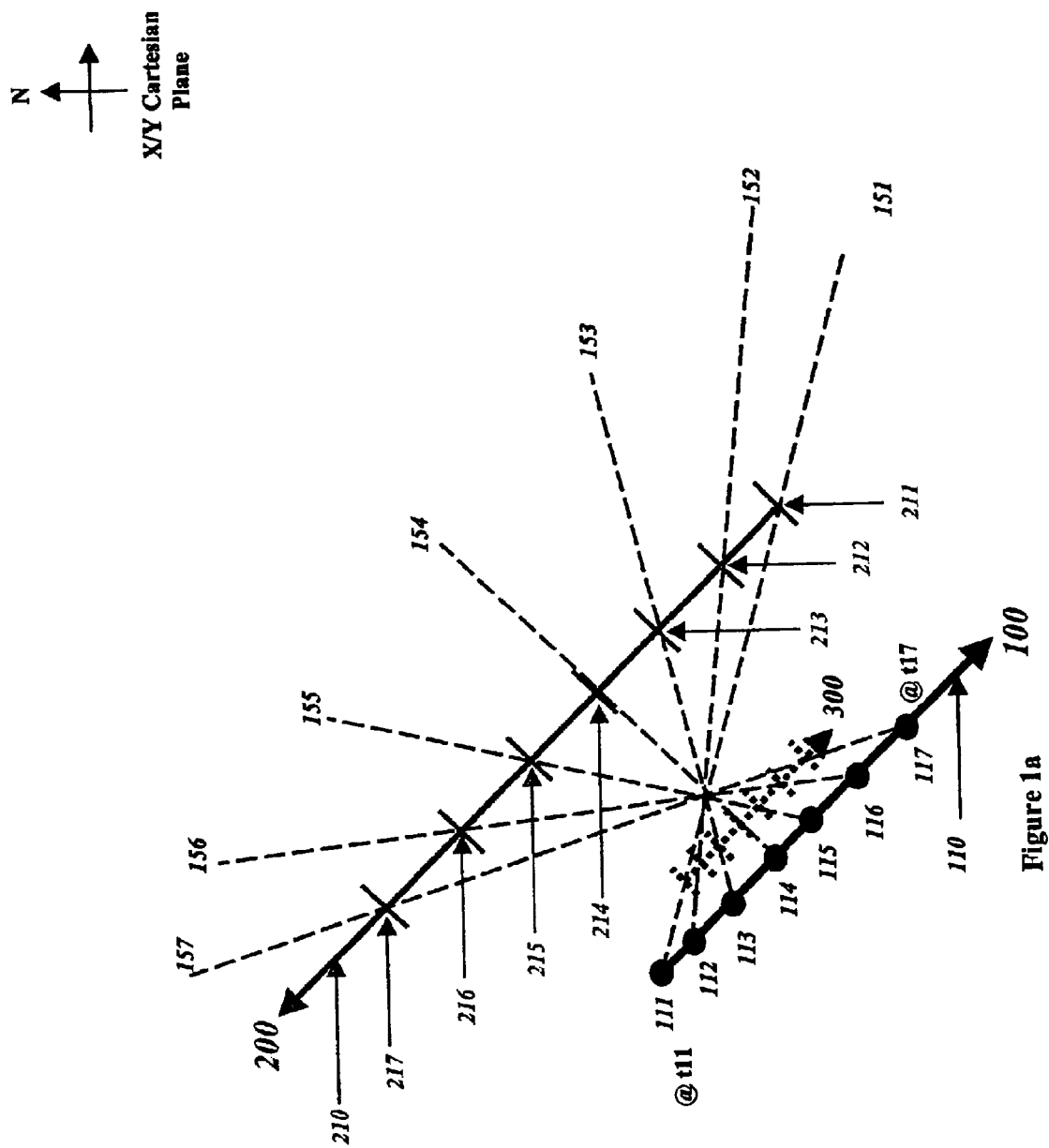

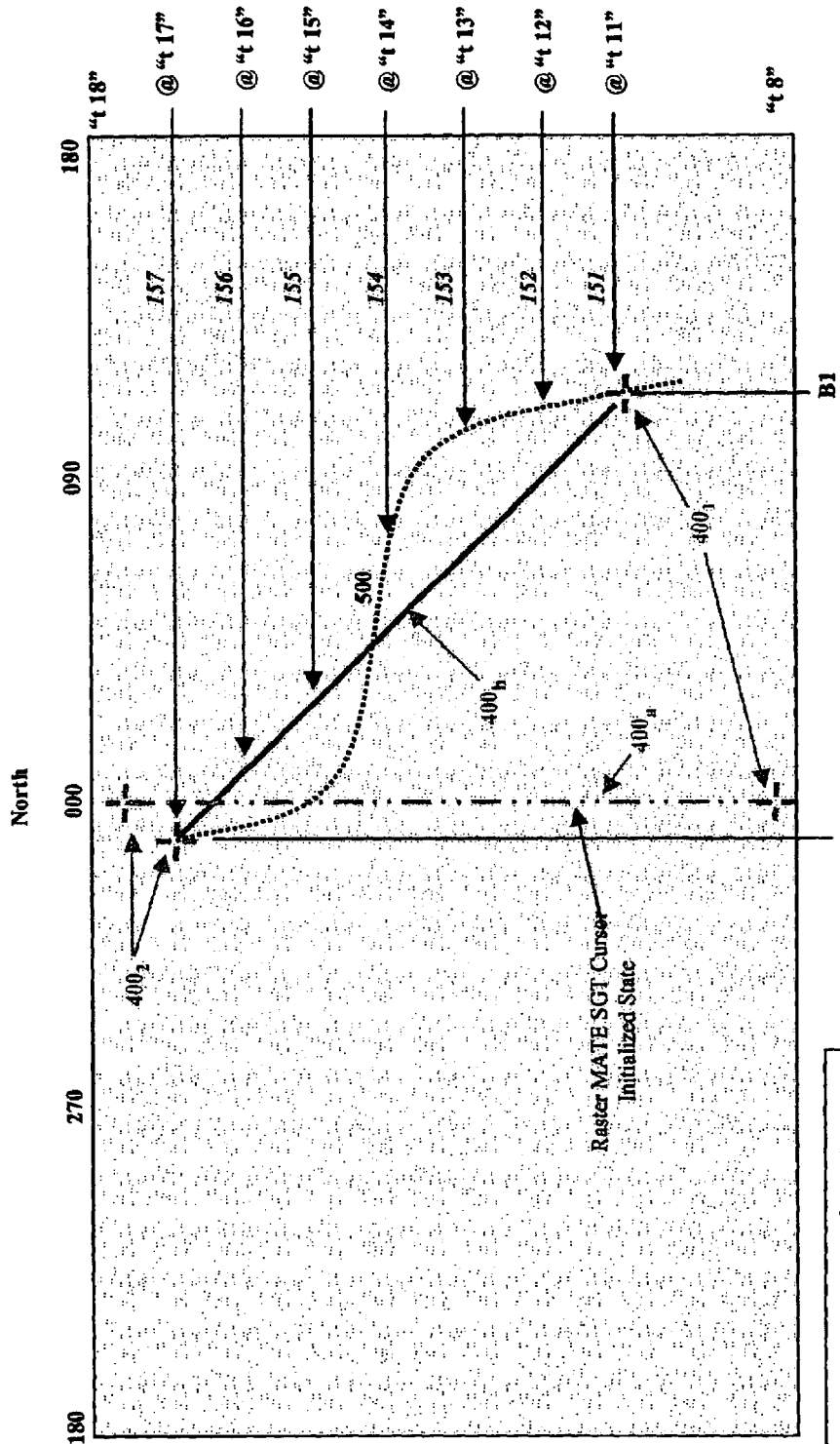
Figure 2a
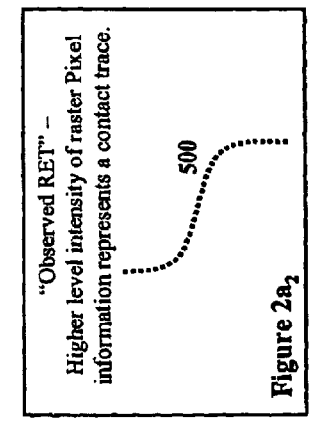
Figure 2a₂
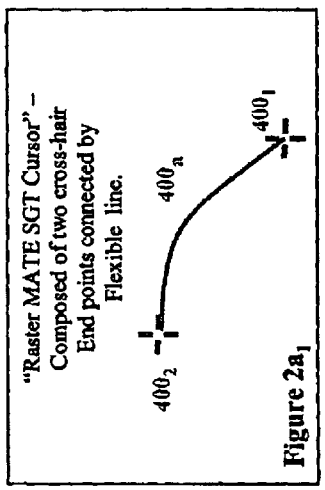
Figure 2a₁

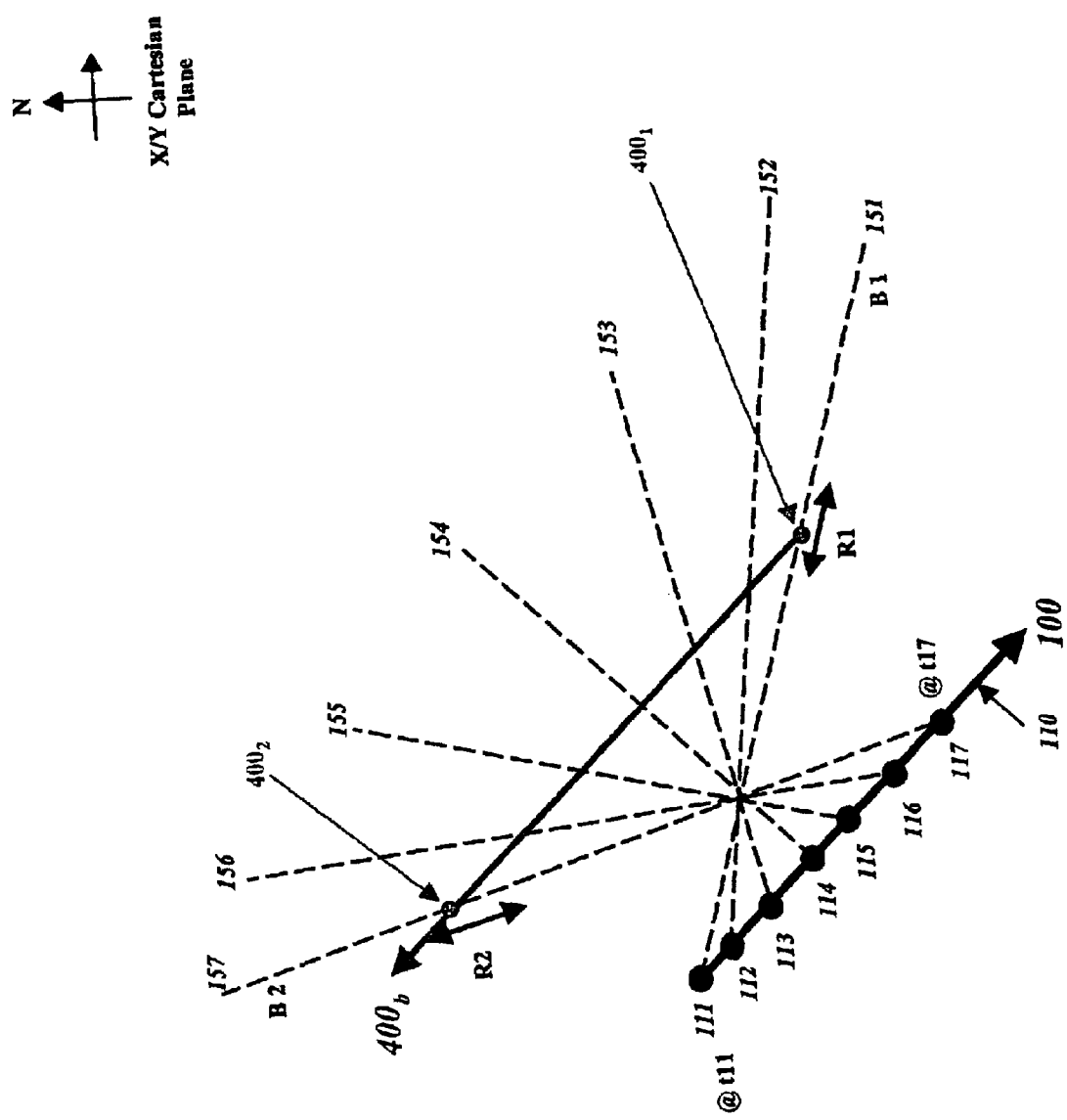

Multiple "Solution Generated Track (SGT)"

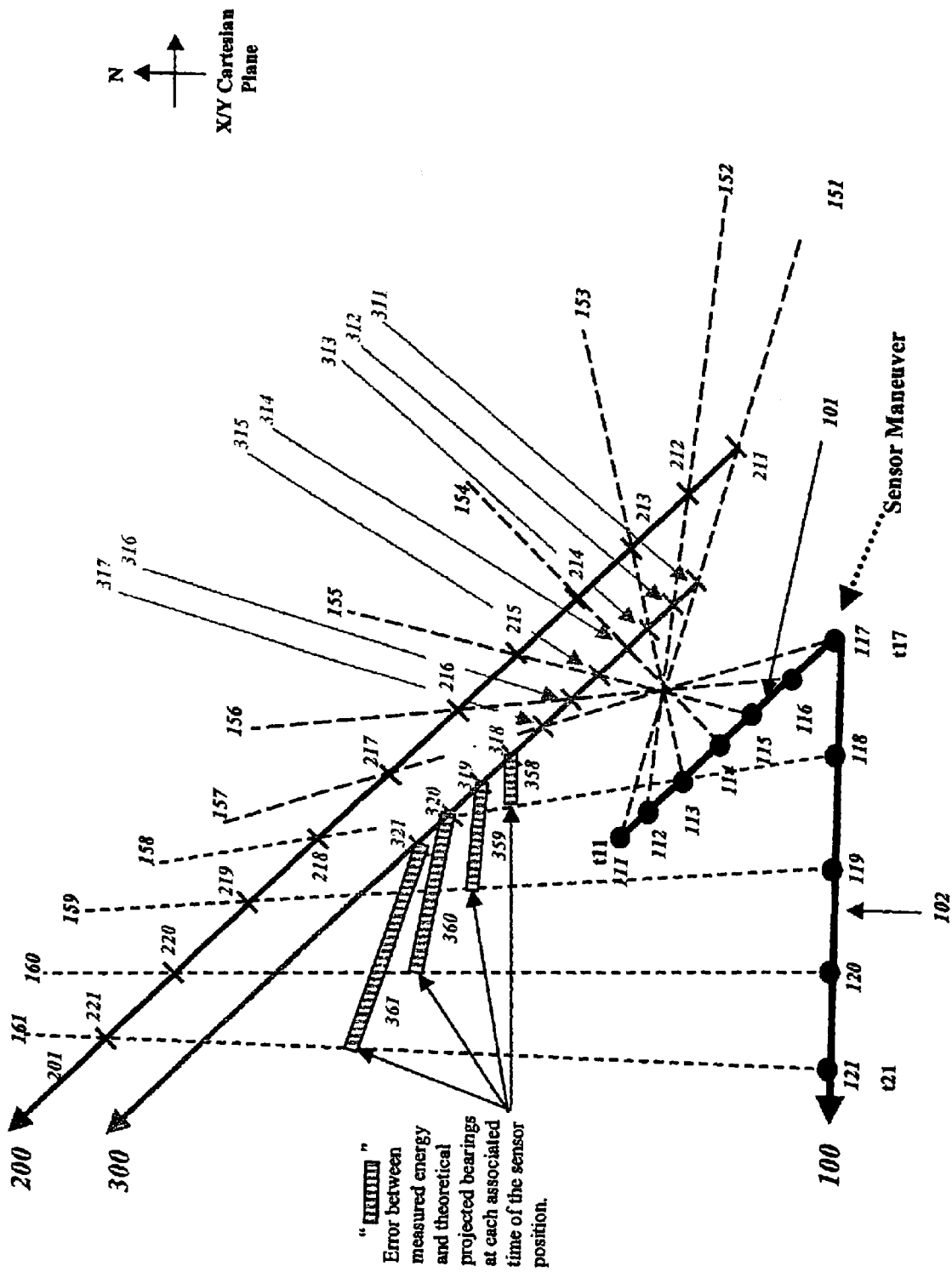

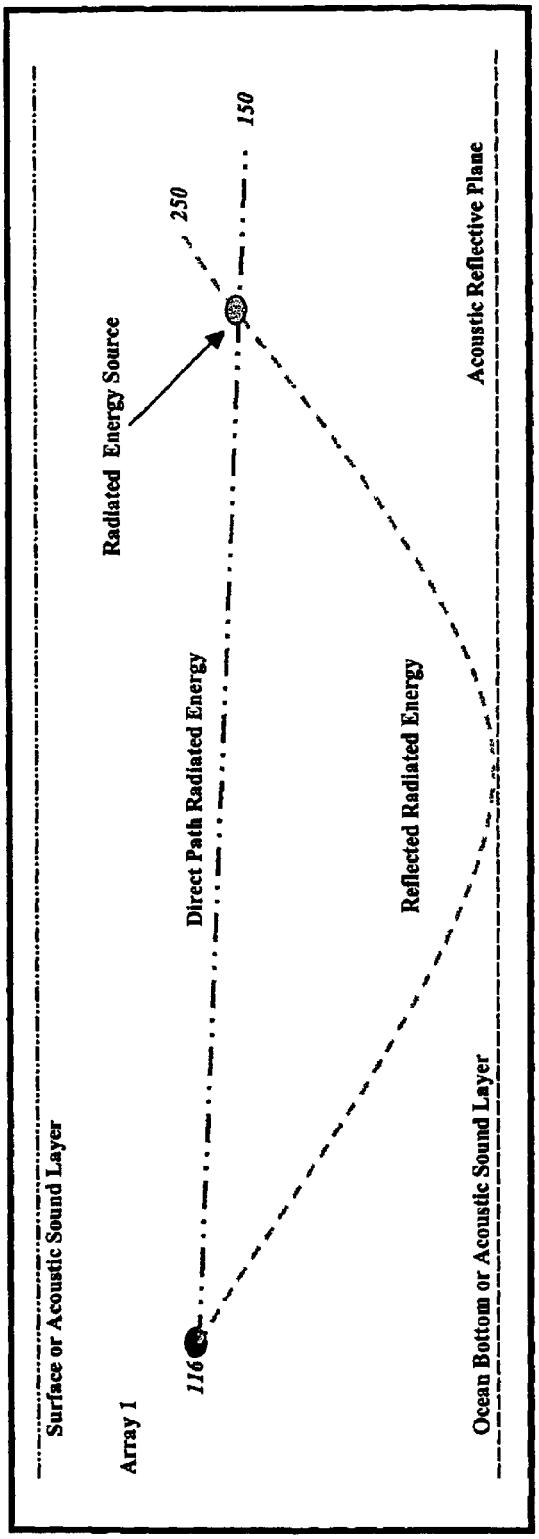
Figure 4c1
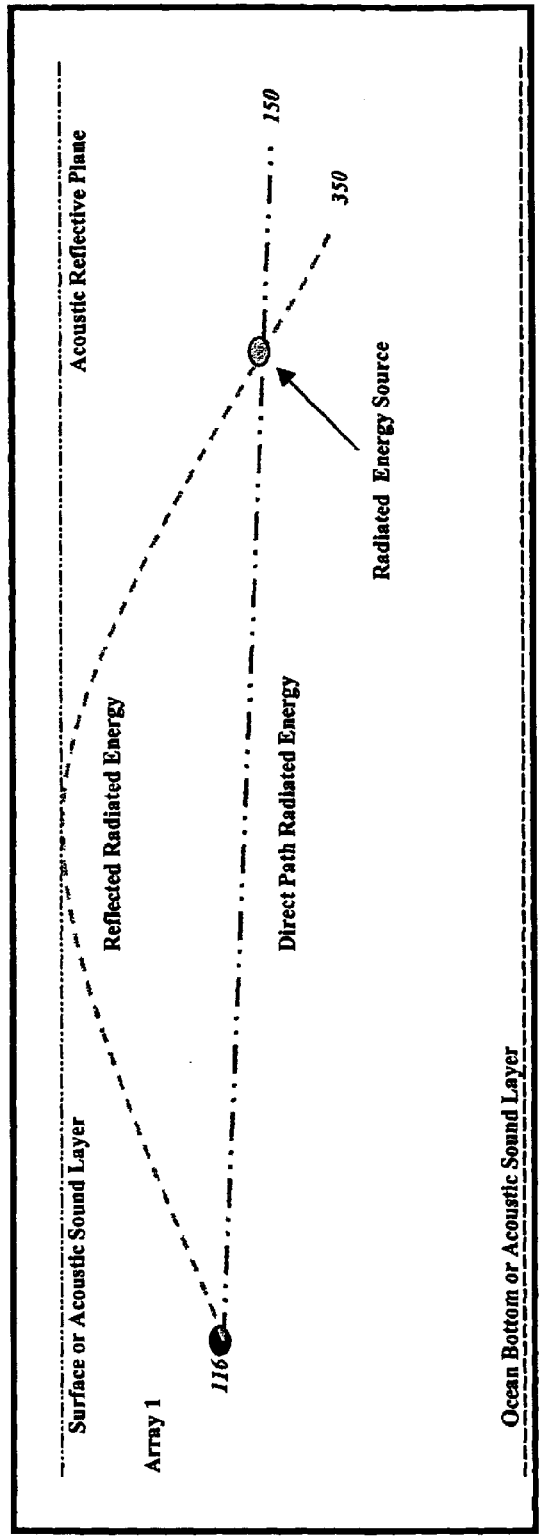
Figure 4c2

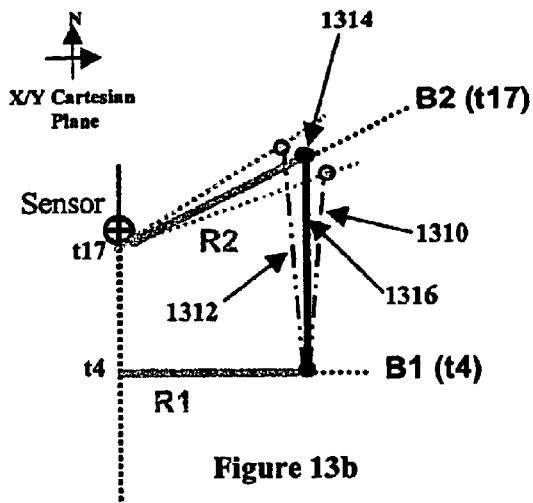
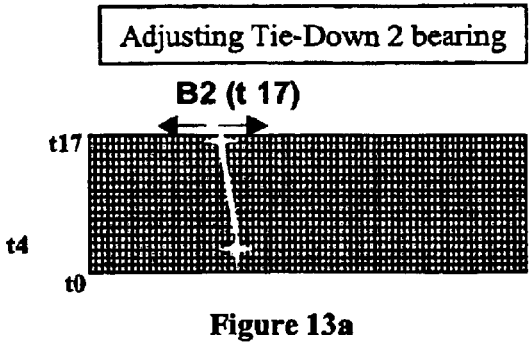
Figure 13b
Figure 13a
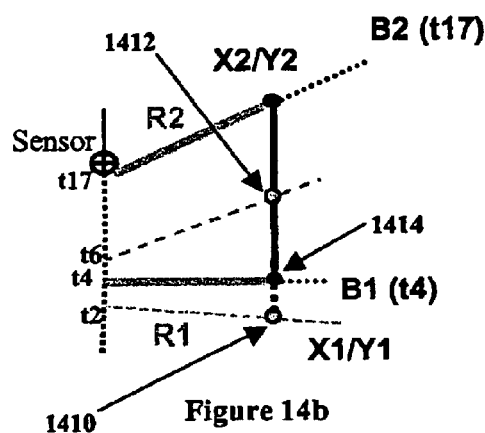
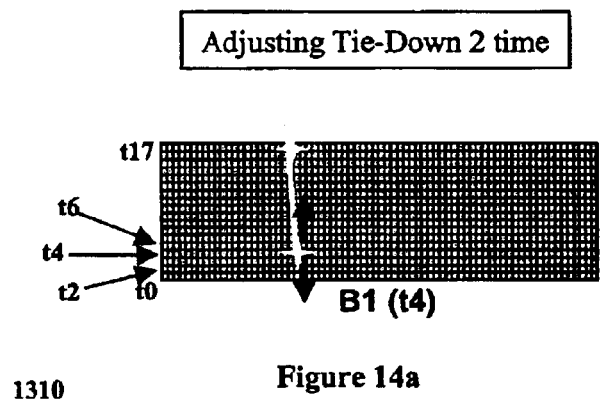
Figure 14b
Figure 14a
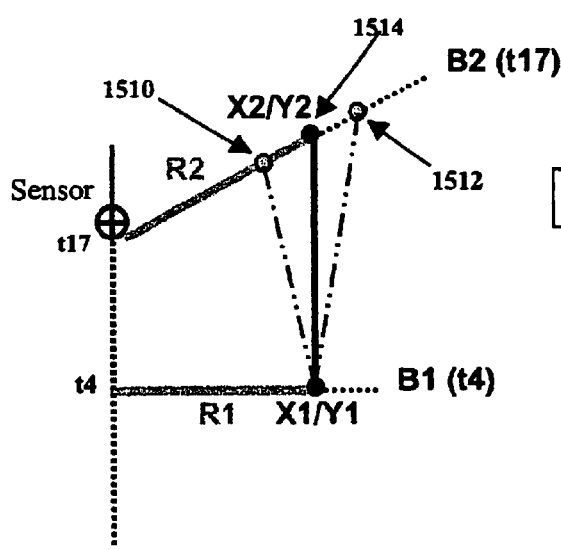
Figure 15

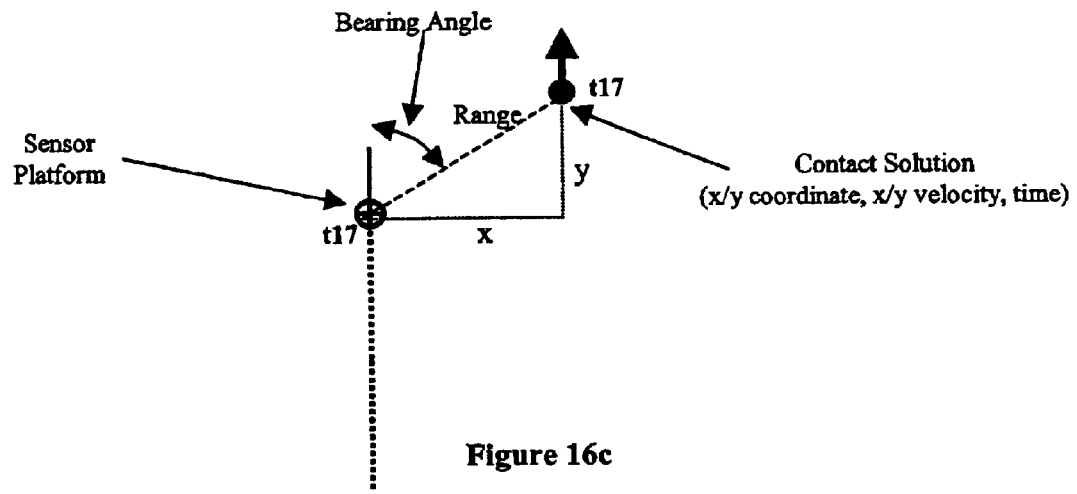
Figure 16c
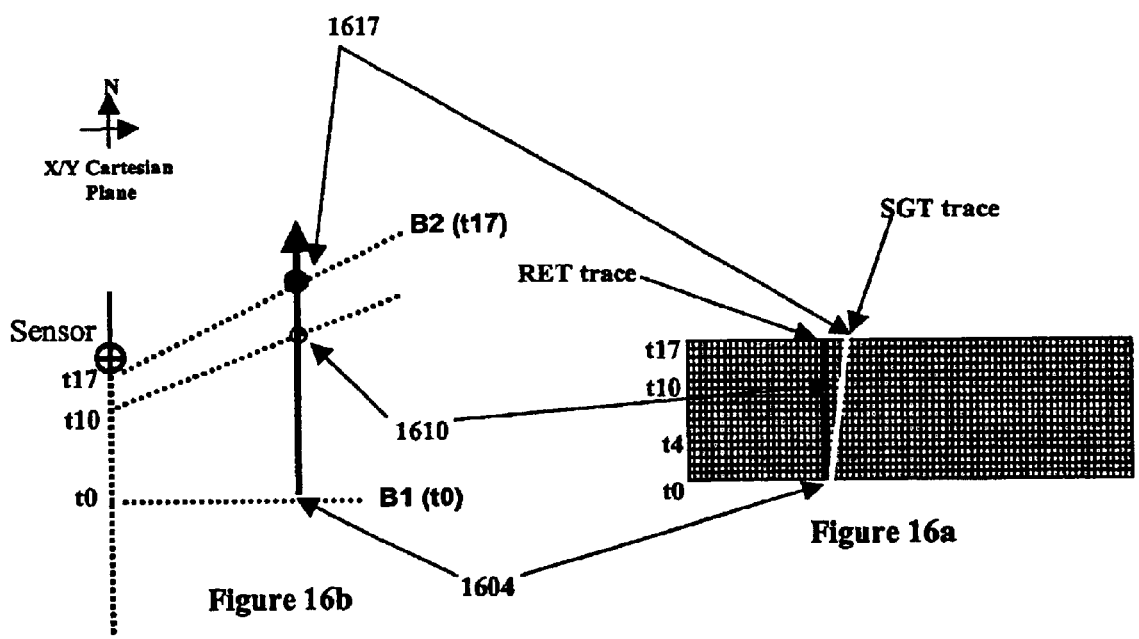
Figure 16a
Figure 16b

RASTER BASED SYSTEM AND METHOD FOR TARGET TRACKING AND MOTION ANALYSIS

CROSS-REFERENCE TO RELATED APPLICATIONS

This application claims the benefit of the priority date of Provisional Application No. 60/399,820, filed Jul. 31, 2002 in the name of Larosa et al.

FIELD OF THE INVENTION

This invention, referred to as "Raster Based Manual Adaptive Target Motion Analysis Evaluation" (Raster MATE) relates to a method or process for target motion analysis using raw acoustic raster data. More specifically, the invention relates to determination of the solution (relative track position and track motion) of a radiating source, and possibly to determination of solution quality, from acoustic raster.

BACKGROUND OF THE INVENTION

Determination of certain position and motion parameters, such as location, range, direction and speed, of a target or radiating source, from information items received from the target or radiating source, is a general problem of considerable importance to many types of surveillance systems. For example, a determined location, direction and speed can be used to track a target and anticipate its future location.

Specific terms associated with various systems referred to in this patent application are defined so as to insure common understanding of the terms.

"Ascan" refers to a single line of acoustic raster energy received at a sensor represented in an amplitude format. The scanning from one reference observation to the next is sometimes referred to as amplitude scanning or Ascan. Displaying the received energy in an amplitude level peak connected line for each observation results in a line of amplitude observations or Ascan at that moment in time.

"Bscan" refers to a single line of acoustic raster energy received at a sensor represented in an intensity format. The scanning from one reference observation to the next is sometimes referred to as bit scanning or Bscan. Displaying the received energy in a color intensity level for each observation results in a line of observations or Bscan at that moment in time. The use of Bscan raster is referred to in many of the descriptions herein.

"Target Position" is the location of the target at any point in time. This location could be defined as, and is not limited to "a Bearing/Range from a sensor location, a Latitude/Longitude location, or X/Y coordinate on a Cartesian Plane."

"Target Track" is a set of target information attributes over time. This set of data points collected over time could be, and is not limited to, bearing information. A data set of bearing could be used to generate a bearing track, which in turn could provide a basis for bearing trend analysis capabilities.

"Target Motion" refers to a direction of motion. This motion normally derived from observing multiple target positions over a specified time period. Track motion attributes could be defined as Course/Speed, Heading/Speed, or X/Y velocities, but are not limited to these attributes.

"Track Measurement" (or Observation) refers to a unique recording of energy radiated from a source or reflected from a target at as specific moment in time. Measurements could be (and are not limited to) Bearing, Conical Angle (in the case of a non-stabilized line array), Range, Inverse Range, Depression/Elevation (D/E), Wave Front Curvature Time Delay, andor Tonal Frequency. Typically track measurements are produced by, or are the output of, a sensor tracker-based function that attempts to follow a specified detected energy source in the sensor's environment. For the purpose of this disclosure, one of these measurements, namely bearing information, is referred to in many of the descriptions herein. With respect to the invention the method could be applied to any form of data received by the sensor subsystem.

"Solution" (or State Vector) refers to the joining of the target position information with the target track information to define a target's unique position and motion at a specific moment in time. Using a solution, one could project the target to a future time and resolve or determine the target's projected position, or project backward in time to resolve where the target was at a moment in time in the past.

"Solution Generated Track (SGT)" refers to a set of solution based data points generated by the use of solution extrapolation or projection algorithms. This set of data points collected over time could be, and is not limited to, bearing information. This data set represents a trend of possible target information over time.

"Received Energy Trace (RET)" refers to a set of received high-energy data points. This set of data points collected over time could include, and is not limited to, bearing energy information. An acoustic raster display may display this energy as a function of bearing. A collective set of high-energy data over time creates an energy trace on an acoustic raster display.

Manual, automatic and computer-aided manual methods for determining location, direction and speed of targets (Target Motion Analysis or TMA) are known in the art. These methods of TMA maintain a few basic aspects in common. For the purpose of this paper the Manual Adaptive Target Motion Analysis Evaluation (MATE), Maximum Likelihood Estimator (MLE), Kalman Statistical Track (KAST) and Solution Imaging Target Motion Analysis Evaluator (SITE) algorithms will be addressed. Each of these TMA algorithms requires a set of track measured data or observations. Each adjusts a set of parameters, as for example x/y position and x/y velocity of the target in the Cartesian plane, to make the track parameters agree with the measurements via a functional relationship. In general, for each of these methods, the set of parameters that agrees well with the measured data is deemed to be the estimated resulting solution. In these traditional methods, a Target Motion Analysis algorithm processes "Track Measurement" data to achieve a desired solution.

An example of a manual method is the Manual Adaptive Target Motion Analysis Evaluation (MATE). In this method, the operator defines a set of tracker-based measurements to be used, edits the measurements to remove bad data, and modifies the parameters of the solution in an attempt to minimize the errors between the measured value and the theoretical value at the same moment in time. An example of an automatic or computer-aided method is a Maximum Likelihood Estimator (MLE). In this method, the MLE algorithm automatically defines the tracker measurement data set based upon algorithm control parameters, attempts to pre-edit the measurements to remove bad data, and automatically adjusts parameters in an algorithmic manner so as to achieve the best solution that agrees with the measurement data set. A second example of an automatic or computer-aided method is a Kalman Statistical Track (KAST). In this method, the KAST starts with a guess at the solution, receives tracker-based measurement data points one at a time and pre-edits the measurements with respect to bad data parameters, then uses the measurements to improve the guess in attempts to narrow in on the best solution with respect to the measurement data set. An example of a manually controlled computer-aided method is a Solution Imaging Target Motion Analysis Evaluator (SITE). In this method, the operator defines a set of tracker-based measurements to be used, edits the measurements to remove bad data, and selects parameters for solution image generation. The image generation process: generates a matrix of the solutions. Each solution is used to quantify the errors between a measured value and a theoretical value at the same moment in time. The resulting matrix provides a graphical representation of solution possibilities coded with respect to the solution error detected. MATE, MLE, KAST and SITE work on a predefined set of tracker-based measurement data per algorithm execution. All algorithms require some type of data editing function to remove bad tracker data from the data set prior to algorithm execution. MLE and KAST adjust the parameters automatically, while MATE and SITE require an operator to adjust the parameters.

An underlying assumption for each of these algorithms is that high-quality tracker-based measurement data is provided to the TMA algorithms from a measurement subsystem, and that the received measurement data has already been (or is already) associated with the target of interest. A problem with current acoustic systems is the inability of the tracker function to track the target of interest and to generate high-quality track measurement data sufficient to allow a solution to be resolved by the TMA algorithms. Erratic or poor tracker data may occur under any of the following conditions, among others:

I. Close-in high bearing rate target situations;
II. Low signal-to-noise (SNR) target environments; and
III. High-density multi-target environments.

Historically, the acoustic portion of the problem has been to identify a target and support automatic or manual tracking of the target for TMA algorithm analysis. The output of the tracking function is ideally well-defined track measurements that are provided as inputs to the TMA algorithm functions. The abovementioned target situations may result in the inability to maintain automatic track on the target, so that the data provided to the TMA algorithms is insufficient for extraction of a solution. Transferring to manual track mode often fails to improve system performance. Some of the reasons for these tracker-based problems include, but are not limited to:

I. trackers are nominally tuned to support a specific range of target bearing rate;
II. during highly variable and high bearing rate scenarios, automatic trackers fail to maintain track on the energy source;
III. automatic trackers are also not capable of tracking the low energy levels experienced for low SNR targets; and
IV. during high-density scenarios, multiple energy sources exist, which tend to confuse the automatic trackers when the energy traces cross, or a stronger trace masks a weaker trace. When energy traces cross, the automatic tracker oftentimes follows the incorrect energy trace.

Any or all of the preceding reasons could result in incorrect data being generated by the tracking function, with consequent poor TMA algorithm results.

Attempts to work around the above situations usually involve having the acoustic operator put the tracker-based function into the manual state, and manually attempting to define the bearing information based upon a trace observed on a raster display (a plot of time or range versus bearing angle, generally with intensity as a parameter). This process of manually marking bearing information depends upon placement of a cursor at a particular position on a "waterfalling" acoustic Bscan raster. Such placement tends to be inaccurate or differs from one scan to the next. Unfortunately, manually generated data usually fails to resolve the problem because it provides noisy data to TMA algorithms. Limitations associated with the generation of manual data is partly due to:

I. inadequate bearing (cursor) resolution on sonar displays. Since bearing (cursor) resolution is a function of sensor beam width, sensor dependent inaccuracies are introduced into the data, when it is sent to the TMA algorithms The limitation of the displays tends to be a function of the sensor beam width. Most displays provide information for operator observation at this level. For automatic trackers, the tracking function uses multiple beams to interpolate a more refined beam set for attempting to follow the target. In manual track function, no additional interpolated beam set normally exists, thereby limiting the operator's ability to generate high-quality data.

II. attempting to mark data on a display that is waterfalling under the operator's control of the manual tracker cursor; and III. data generated manually is a single point pick method based upon the cursor position on the raster, which adds noise to the data when sent to the TMA algorithms.

Because of the above-mentioned problems with automatic and manual data generation, data transferred to TMA algorithms oftentimes is not adequate to support resolution of a target solution. In the above environments, lost automatic tracker data, and noisy manually generated acoustic data contains much misleading information, complicating the TMA process, which in turn may result in unsatisfactory overall TMA performance.

In all the abovedescribed situations, the TMA algorithm processes are provided with data to be used in resolving the target solution. If the data provided is misleading, inaccurate, or an incomplete set of measurements, then the quality and possibility of timely resolution of a solution for the target diminishes. In each abovedescribed situation, the tracker data fails to provide the information observed by the operator on the acoustic Bscan raster data.

Hence, there is a need for a system that provides fast and accurate target solution along with a merit of solution quality for evaluation. The method disclosed below negates the requirement of tracker-based measurement data by using the raw acoustic Bscan raster data for algorithmic solution generation.

SUMMARY OF THE INVENTION

A method for Target Motion Analysis according to an aspect of the invention, or for determining location information associated with a contact based upon acoustic raster data received from at least one sensor, comprises the step of deriving target trace data from coordinates associated with the acoustic raster data. The derived target trace data is compared with the raster data, and the derived target trace data is updated or adjusted by resetting at least one of time, bearing and range parameters associated with the derived target trace. This resetting of the time, bearing and/or range parameters is for minimizing the differences between the target trace data and the raster data.

A system according to another aspect of the invention is for determining location information associated with a contact. The system comprises a detector for detecting and processing acoustic data to generate raster data associated with a contact. The system also includes a computer having a memory and a processor responsive to the generated raster data for deriving target trace data from coordinates associated with the generated raster data. The computer includes a user interface enabling visual comparison of the target trace data with the raster data, and means for adjusting at least one of time, bearing and range parameters associated with the derived target trace, to cause the processor to update the target trace data for minimizing the differences between the target trace data and the raster data.

A method according to another aspect of the invention is for deriving a contact solution based upon raster data. The method includes the step of processing received acoustic data to generate raster data associated with a contact. The method also includes the steps of deriving target trace data from coordinates associated with the acoustic raster data, and comparing the derived target trace data with the raster-data. The derived target trace data is updated by adjusting at least one of time, bearing and range parameters associated with the derived target trace for minimizing the differences between the target trace data and the raster data.

A system for deriving a solution on a contact includes a detector for detecting and processing acoustic data, to generate raster data associated with the contact. The system also includes a computer having a memory and a processor responsive to the generated raster data for deriving target trace data from coordinates associated with the generated raster data. The computer includes a user interface, which enables visual comparison of the target trace data with the raster data, and also includes an arrangement or means for adjusting at least one of time, bearing and range parameters associated with the derived target trace, to cause the processor to update the target trace data for minimizing the differences between the target trace data and the raster data. The processor provides range, bearing, course and speed of the contact based on the acoustic data.

BRIEF DESCRIPTION OF THE DRAWINGS

FIG. 1a illustrates a geographic Cartesian coordinate system representation of a conventional method for processing good Target Track measurements received from a radiating source.

FIG. 2a illustrates an acoustic Bscan raster plot depicting an initial Raster MATE SGT cursor positioning as generated according to an aspect of the invention by the Raster MATE method, FIG. 2b illustrates a geographic Cartesian coordinate system representation of the Raster MATE SGT cursor initialization after modification of the tie-down points as observed in FIG. 2a, FIG. 2c illustrates an acoustic Bscan raster plot as initially observed in FIG. 2a with multiple possible solutions.

FIG. 3a illustrates a geographic Cartesian coordinate system representation of a conventional method for processing good track measurements received from a radiating source through a sensor maneuver to focalize the target solution range.

FIGS. 4c1 and 4c2 illustrate a geographic Cartesian coordinate system representation of vertical triangulation from a single sensor.

FIG. 10a depicts the initial default position of the cursor when the method is initialized, FIG. 10b depicts the results of an iterative process between the operator and the system method to have the cursor fit to the RET, and FIG. 10c depicts a geographic representation of the resulting Raster MATE SGT cursor as positioned by the operator in FIG. 10b;

FIGS. 13a, 13b, 14a, 14b, 15, 16a, 16b and 16c all illustrate the abilities of the Raster MATE process to compute a target solution via use of a Raster MATE SGT cursor using only acoustic energy, and in particular FIGS. 13a and 14a illustrate the operational aspects of the Raster MATE SGT cursor, FIGS. 13b, 14b and 15 illustrate the resulting geographical presentation of the Raster MATE method, FIGS. 16a, 16b, and 16c illustrate the process of overlaying a SGT overlay projection based upon a single target solution attributes (x,y,x-velocity, y-velocity, time), these FIGURES are supplied for a better understanding of the raster MATE method with respect to how it pertains to the overall geographic view of the acoustic situation.

Figure 1B:
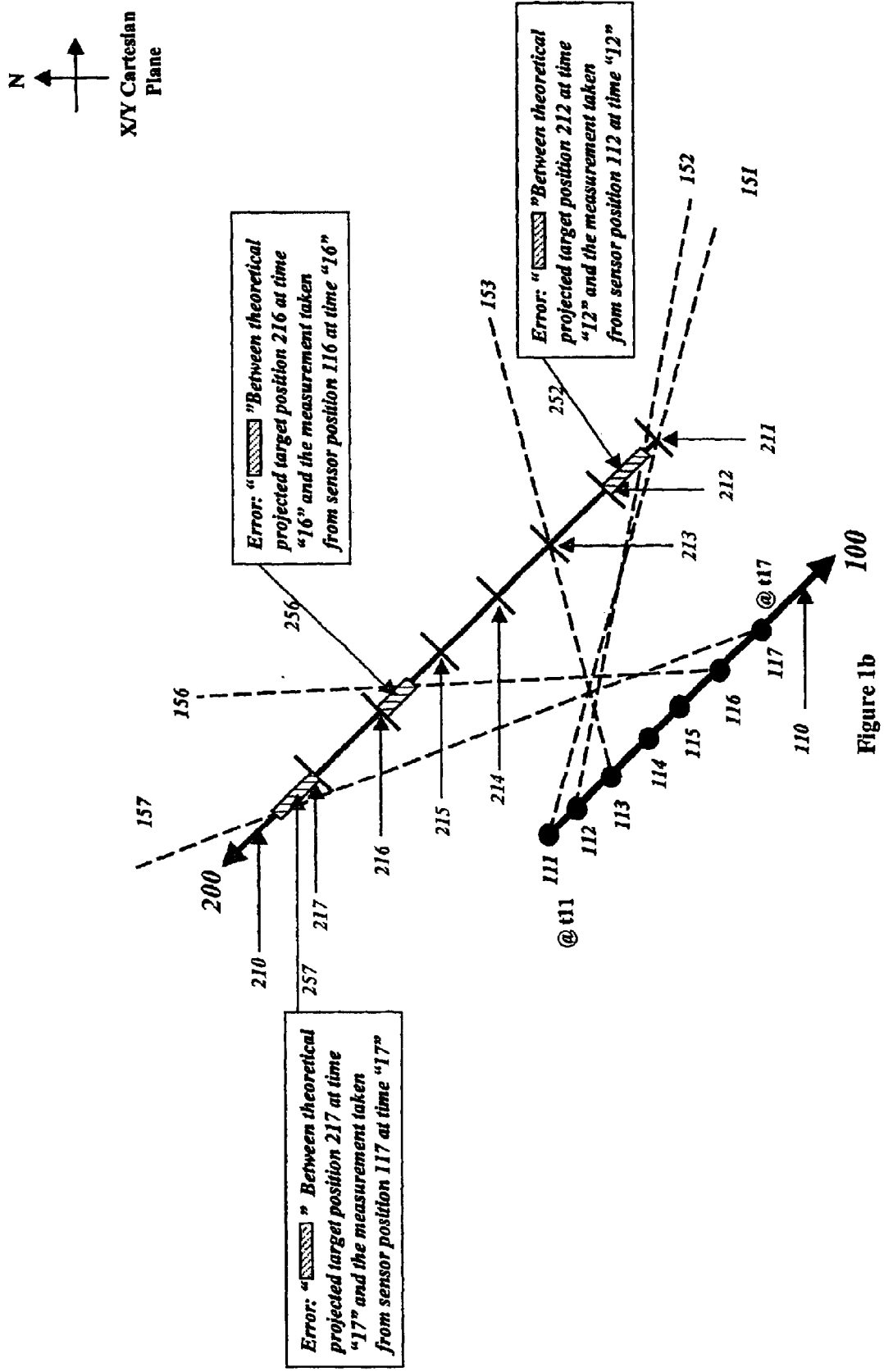
FIG. 1b illustrates the same geographic Cartesian coordinate system representation of a conventional method for processing bad or missing track measurements from a radiating source.

The FIGURES reference true North oriented bearings when observed from the sensor source. It is to be understood that these drawings are solely for purposes of illustrating the concepts of the invention and are not intended as an indication of the limits of the invention. It will be appreciated that the same reference numerals, possibly supplemented with reference characters or prefixes where appropriate, are used throughout to identify corresponding parts.

DESCRIPTION OF THE INVENTION

The Raster MATE method generates a defined relative target solution. From the relative solution a Solution Generated track (SGT) is obtained and overlaid onto the original raster data. The method then provides a means to allow the operator to modify the relative track solution, thereby changing the displayed SGT to ensure the best fit of the SGT to the displayed or observed RET in the raster data.

Raster MATE uses as its input signal the acoustic Bscan raster data generated by the beam forming process of the acoustic subsystem. This method while described for Bscan data is not limited to only Bscan data in that the method supports the use of Ascan raster data over time. This allows the operator to observe graduated amplitudes at each beam. Acoustic Bscan raster data is generated by a beam forming process defining specific unique beams of information based upon hydrophone arrangement of the specific array. Color intensity levels scale the observed energy detected within a specific beam for ready understanding of the displayed information. A strong target signal is observed as a brightened energy trace, while the absence of energy results in a background level of brightness. This data is collected and maintained over time providing a time vs. beam plot of received energy information.

FIG. 1a illustrates a typical conventional plot of accurate track measurement data received by a moving receiving system 100, where the track measurement data was emitted from a moving target 200. A sensor track history (110) is plotted with points 111 through 117 depict sensor historical positional information, with the sensors current position at point 100. A theoretical Target Track (210) is depicted by the line projection from point 211 to point 200; with points 211 through 217 being the time associated theoretical target positions with respect to the sensor positions 111 through 117. A second possible minimal error Target Track that could also fit the data set is observed by the dotted line target track 300. Each of the corresponding Target Track points is noted by the use of a perpendicular crosshatch. The dashed line projections are the sensors associated bearing projections indicating the direction of the received target energy at that unique moment in time. FIG. 1a depicts a theoretical Solution Generated Track (SGT) based upon high quality measurements resulting in minimal errors between the theoretical position of the target and the measured information at the same moment in time. In this FIGURE observations are observed for every moment in time with respect to the sensor position. FIG. 1a depicts a theoretical Solution Generated Track (SGT) based upon high-quality measurements, which result in minimal errors between the theoretical position of the target and the measured information at the same moment in time. FIG. 1a together with FIG. 1b illustrates some problems associated with the use of good data as opposed to bad data in Target Motion Analysis (TMA) algorithm processing. In the illustrative example of FIG. 1a, the receiving system 100 and emitter 200 are traveling at approximately the same speeds on mutually reciprocal courses. The positions of the sensor platform and the target establish, over time, generated tracks illustrated as 110 and 210, respectively, of FIG. 1a. At target points along track 210 illustrated as 211, 212, 213, 214, 215, 216, and 217 (211 through 217), bearing lines, illustrated as dash lines 151 through 157, correspond to the direction of arrival of received track measurement data emitted by target 200. Sensor position points 111 through 117 correspond to those locations of receiving system 100 at which track measurement data was received from target 200. Position points 111 through 117 may be represented in any kind of coordinate system, as for example in an x-y or Cartesian coordinate system, a polar, a spherical coordinate system, or as latitude/longitude, with the appropriate correction for longitude convergence.

From FIG. 1a, one can see that at any given time, corresponding to the successive sensor position points 111 through 117, the relative direction of a target 210 is known, but the range, course, and speed of the target is not known. Given only the relative bearing information illustrated in FIG. 1a, track solutions other than target 200 are possible, as shown by the second possible dotted line target 300, which also fits with minimal error to the original track bearing measurement data. That is, energy emitting along bearing line 151 emanating from target point 211 cannot ascertain the range or location of target 200, represented as point 211, at the time of the intercept. Consequently, the target location could in principle lie anywhere on bearing line 151. Similarly, energy emitting along bearing line 152 emanating from target point 212 cannot be used to ascertain the range or location of target 200, represented as point 212, at the time of the intercept, and the target location could lie anywhere on bearing line 152. In this illustrative example, by using sequential track measurements, it is possible to ascertain the Direction of Relative Motion (DRM) of target 200 depending upon an assumed range of the target. It is possible, by the use of sequential track measurements, to ascertain the maximum range to target 200, or to ascertain the range to within a predetermined level of certainty or within given parameters, as for example, within 100 meters based upon a course or maximum speed imputed to the target.

FIG. 1b illustrates the same geographic Cartesian coordinate system representation as that of FIG. 1a, showing a conventional for processing bad or missing track measurements from a radiating source. In FIG. 1b, the illustrated track 210 of target 200 is assumed to be correct. The tagged points in the diagram of FIG. 1b associate to the same sensor and target positions of FIG. 1a. This diagram depicts error between theoretical target positions and the measure data associated in time. An example of the error is noted as the hatched block 257 projecting from the target track crosshatch point 217 to the time corresponding dotted line projection 157. In this FIGURE data points 114 and 115 had no observed measurements for error analysis of the theoretical target track at points 214 and 215. The missing data does not allow for error analysis at the time of the projected target track points 214 and 215. Measurements 152 and 156 fail to intersect the theoretical Target Track at the respective points 212 and 216. This failure to intersect is deemed as being a measurable amount of error observable by the operator as depicted as error 252 and 256 respectively. In FIG. 1b, with missing track measurement data, bearing projections 154 and 155, and/or bad track measurement data projections 152, 156, and 157, attempting to fit a linear solution state vector generated track to the measurement data is difficult, if not impossible. The actual target track 200 does not correctly fit the data received, projections 152, 156, and 157, as observed by the errors, illustrated as hatched blocks 252, 256, and 257, respectively, between the track measurement data and the theoretical projected target position associated to the time of the track measurement. A target SGT could be manipulated to a better fit of the data. In this case the operator or automatic algorithm would result in an incorrect solution based upon bad track measurement data.

Figure 1C:
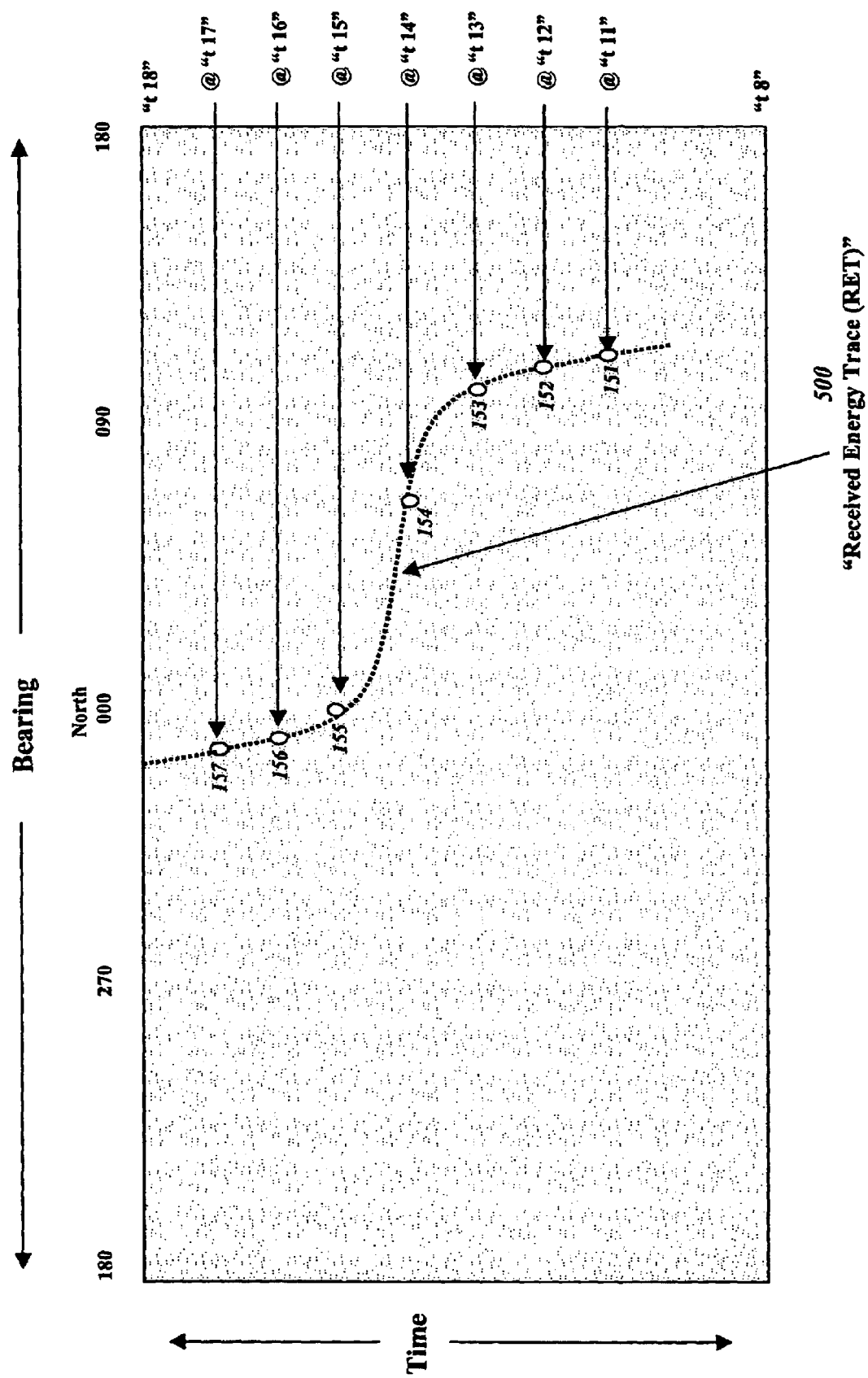
FIG. 1c illustrates an acoustic Bscan raster plot.
Figure 1D:
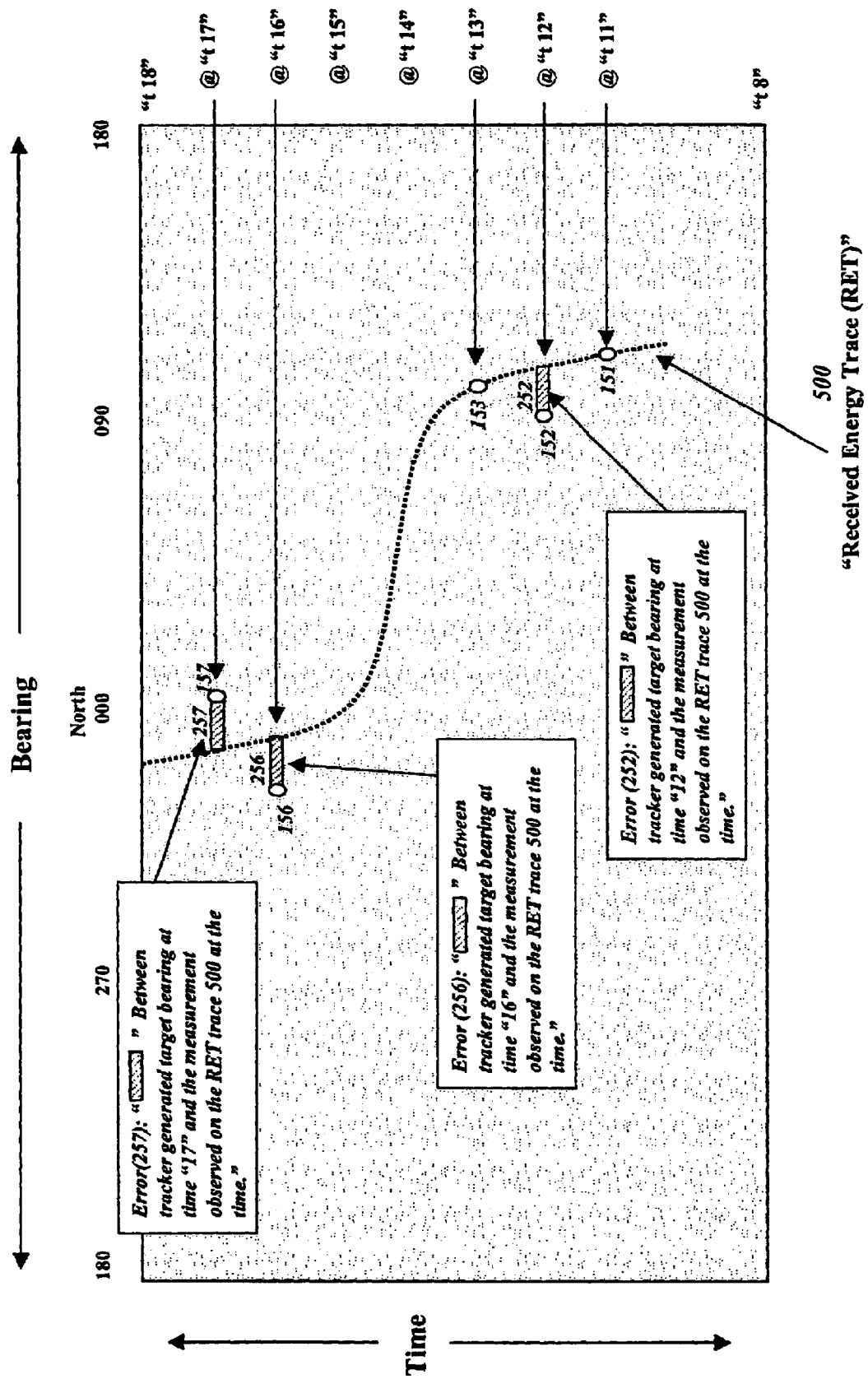
FIG. 1d illustrates the same acoustic Bscan raster plot as observed in FIG. 1c with the difference being the plotted tracker generation data.

FIG. 1c illustrates an acoustic Bscan raster display of time versus target bearing. The horizontal axis is the sensor measurement axis, and the vertical axis is the time history axis, with time t18 as the most recent or latest time, and time t8 as the oldest or most remote time. The most current line of measurements is displayed at the top of the plot. Moving down the plot line by line the measurement lines equate to history of measurements over time. As each new line of measurement information is added to the top of the plot the existing lines of data shift down with the oldest line being lost. The dotted line 500 observable on the plot is a higher energy level trace of raster information observable by the operator. The observed RET 500 corresponds to the history of received energy that would have been observed for the FIG. 1a scenario. The large dots 151 through 157 represent where a tracker, if tracking, would have generated the tracker-based data as observed in FIG. 1a. The tracker data points are shown superimposed on the Bscan raster data plot for observational aid in referring between FIGS. 1a and 1c. FIG. 1c presents the same target track 210 of FIG. 1a as a RET represented by a dotted line 500 lying within the data view port. Bearing lines 151 through 157 are made or occur at times designated as t11 through t17, respectively. In FIG. 1c, the tracker-generated bearings 151 through 157 are observable as larger dots on the data view port, which is to say that the bearing measured at sensor position time t11 (bearing 151) is at about 130° or Southeast, corresponding to that shown in FIG. 1c. Similarly, the target bearing 152 of RET 500 and associated with sensor position time t12 is somewhat more northerly, possibly at about 120°. The left-most target bearing 157 illustrated in RET 500 of FIG. 1c occurs at sensor position time t17, and is about 300° or Northwest. In FIG. 1d, "Errors" can be seen which are due to the effects of tracker errors/tracker destabilization, or to the effects of manually marked tracker data in the TMA problem. The large dots 151, 152, 153, 156 and 157 in FIG. 1d again represent the tracker-generated data. In FIG. 1d the error bars 252, 256 and 257 associated with the error from the observed RET 500 to the tracker generated data points. The tracker data points are shown superimposed on the Bscan raster data plot for observational aid in referring between FIGS. 1b and 1d. In FIG. 1d, the corresponding FIG. 1b errors can be observed as the hatched blocks associated with the respective generated track bearing points (depicted as large dots 151, 152, 153, 156 and 157) on the acoustic raster and the actual target received bearing indicated by the dotted line RET 500 at the respective time. From FIG. 1d one could easily observe that the tracker data, namely points 152, 156, and 157 do not represent the actual targets received radiated energy RET 500.

FIG. 1d illustrates the same acoustic Bscan raster plot as that of FIG. 1c, with the difference being the plotted tracker generation data. The circles 151, 152, 153, 156, and 157 represent the theoretical tracker-generated data. In FIG. 1d, the error bars 252, 256, and 257 are associated with the error from the observed acoustic energy to the tracker data points.

Figure 2C:
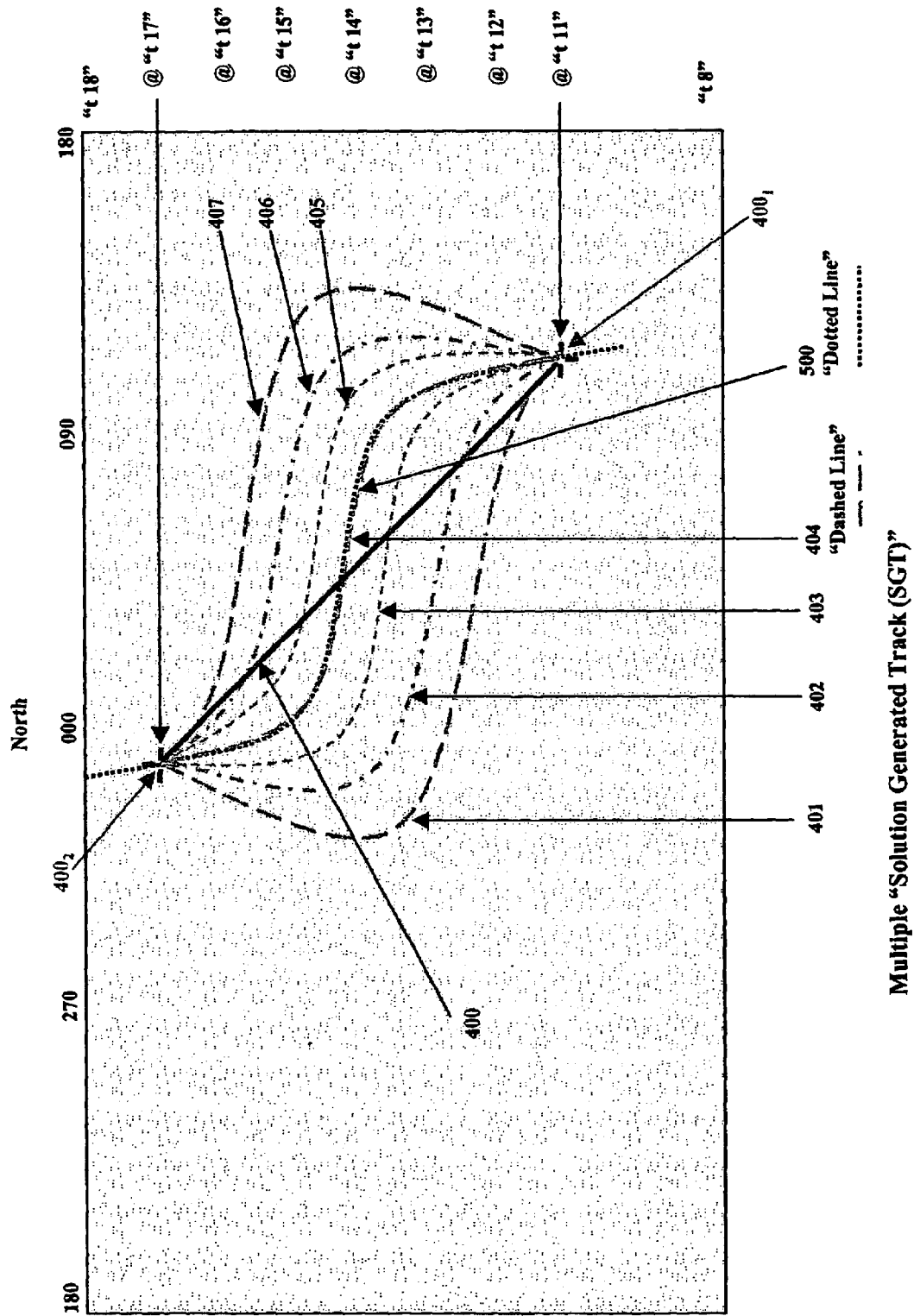

The problems associated with the tracking data described in conjunction with FIG. 1b led to target solution analysis/ generation based upon the acoustic Bscan raster data according to an aspect of the invention. Basing the solution on the acoustic Bscan raster data tends to eliminate all the errors previously observed from the automatic tracker or from manually generated data measurements. FIGS. 2a through 2d depict a method of conducting Target Motion Analysis directly using the acoustic Bscan raster data, according to an aspect of the invention. In FIG. 2a, the received energy trace (RET) is designated 500. FIG. 2a illustrates an acoustic Bscan raster plot depicting an initial Raster MATE SGT cursor $400_a$ positioning as generated by the Raster MATE method. The cursor consists of two tie-down points $400_1$ and $400_2$, which are connected by SGT projection line $400_a$ as depicted in FIG. $2a_1$. This SGT projection line depicts the theoretical measurements with respect to time based upon the sensors position. Upon cursor initialization the operator uses the cursor controls to position the cursor start/end points, $400_1$ and $400_2$, to two points of the observed RET 500. The observed re-positioned cursor is illustrated as line $400_b$ superimposed over the raster plot. FIG. $2a_2$ illustrates an "Observed Energy" or "contact" trace RET 500 in the form of higher-level intensity or raster pixel information. A Raster MATE SGT cursor is illustrated in FIG. $2a_1$ as including two cross-hair end points connected by a "flexible" line. A Raster MATE SGT cursor designated 400a is initialized on the Bscan raster data of FIG. 2a. A straight-line segment, as represented by cursor $400_a$, initially connects Tie-down points $400_1$ and $400_2$. The operator uses the cursor to define two tie-down points $400_1$ and $400_2$ along the RET 500 at unique time/bearing combinations (t11/B1 and t17/ B2). These two points $400_1$ and $400_2$ are selected in FIG. 2a along the RET 500, but they could be selected at other locations. At each of the defined tie-down time/bearing combinations, a default cursor range is assumed. FIG. 2b illustrates a geographical Cartesian coordinate system representation of the. RASTER MATE SGT cursor initialization after modification of the tie-down points B1 and B2 as illustrated in FIG. 2A. The geographic representation of FIG. 2B depicts measurement projections, 151 through 157, over time from the sensor position 111 through 117. Each measurement over time depicts a theoretical tracker bearing that associates to a single line of history on the raster acoustic Bscan plot. Movement of Range 1 (R1) along and bearing around the tie-down bearing 1 axis (B1) 151 is allowed in for proper placement of the $400_1$ tie-down point. Adjustment of the bearing is allowed for refined placement of the cursor on top of the raster Bscan information. This bearing adjustment would be observable as a delta from a tracker data projection. Respectively, R2 and B2 delta change are used for proper placement of the $400_2$ tie-down point. The Raster MATE SGT cursor's tie-down points $400_1$ and $400_2$ are displayed along the solution track and are adjustable in range at the selected tie-down bearing 151 and 157, respectively. The operator has the ability to adjust the range along the associated tie-down bearing. Based upon the observed RET 500 on FIG. 2a, the tie-down bearings are initially picked by the operator so that each end of the cursor $400_b$ represent a start and end point in time and bearing of the observed RET 500. The bearing and range combination at each of the tie-down points represents explicit X/Y Cartesian coordinates (target positions) in time as depicted in FIG. 2b. Assuming two X/Y combinations with respect to a delta time (ΔT) makes it possible to generate X/Y velocity information. Using the X/Y Coordinates, the time associated to the coordinates (that is, the time at which the target is at those coordinates), and the associated X/Y velocity, the target X/Y coordinates could be computed at any point in time, assuming a constant course/speed target track. In the Raster MATE method, the operator controls designation of the time/bearing tie-down points and a range along each of the tie-down bearing projections.

The method does not limit the process to using only two defined tie-down points to compute a SGT. The method supports designation of a solution using other coordinate attributes such as defining a single range/bearing from a sensor position with an associated course/speed or defining a unique x/y coordinate with x/y velocity attributes or a unique Latitude/Longitude with movement attributes. Various ways of establishing a SGT using the raster mate method are supported.

Figure 2D:
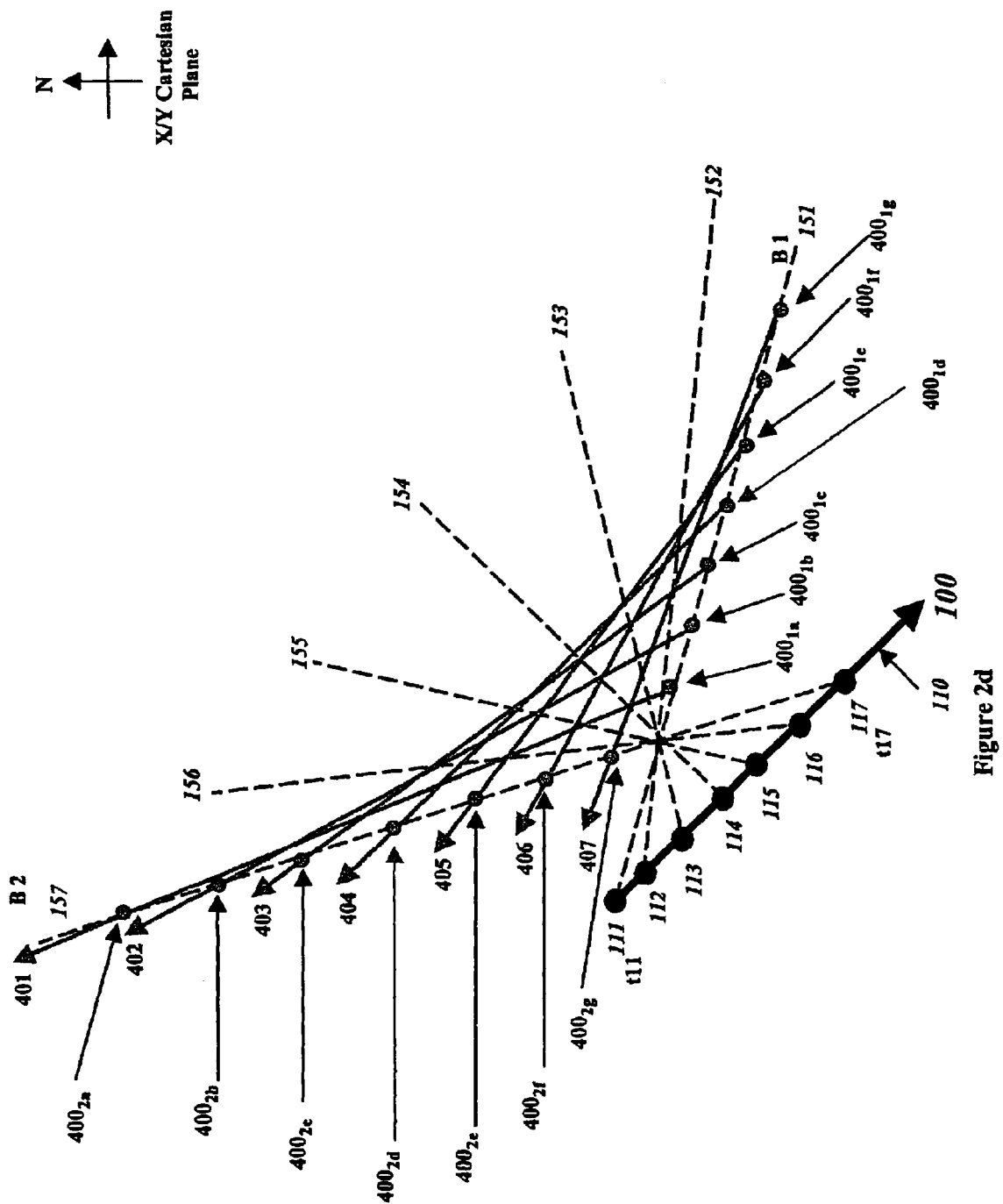
FIG. 2d illustrates a geographic Cartesian coordinate system representation of the multiple observed SGT in FIG. 2c.

As the operator adjusts or selects a range along a specific bearing, the target solution is modified to accommodate the new range along that bearing. The new range defines a new X/Y Coordinate, which when associated with the X/Y coordinate of the other tie-down point defines a new target X/Y velocity. Using the tie-down X/Y coordinate, time and X/Y velocity terms associated with the new solution, the Raster MATE method computes the solution bearing at the time of each line of raster displayed on the plot between the tie-down points. In this context, a "line of raster" refers to a single horizontal scan of information across the raster plot, representing a unique time and sensor position, and the raster plot is a waterfalling plot of such raster lines. Connecting these time/bearing combination results in a cursor being displayed on top of the Bscan raster data that represents the target solution over time. This cursor is the Raster MATE SGT cursor. FIG. 2c illustrates an acoustic Bscan raster plot as initially observed in FIG. 2a with multiple possible solutions represented by SGT 401 through 407. Each SGT associates to a unique Target Track over time. The initial Raster MATE solution with adjusted tie-down points is depicted as SGT 400. By modification of the range values at each of the tie-down points the operator is able to define a unique SGT. Each of the unique SGT 401 through 407 results in a defined set of time verse bearing information with respect to the original sensor positions. SGT 404 is the best fitting Raster MATE SGT cursor solution providing minimal error between the theoretical solution 404 and the actual observed RET 500. FIG. 2c depicts SGT 400 through 407 plotted based on calculations, in turn based upon the operator's defined time/bearing tie-down points and tie-down ranges along the two tie-down bearings. Ordinarily, the set of SGT 400 through 407 would not be displayed at the same time, so the illustration of FIG. 2c may be viewed as showing the RET 500 and a representative set of the SGT that the operator can command. Thus, only one SGT would be displayed at a time based upon the current Raster MATE SGT cursor solution. FIG. 2d is a geographic Cartesian coordinate system representation of the multiple observed solutions in FIG. 2c, and may be viewed as a set of geographical plots 401–407 corresponding to the SGT 401 through 407 of FIG. 2c. Each of solution projections 401 through 407 represents unique target tracks over time based upon specific bearing/range tie-down points $400_{1a}$ through $400_{1g}$ along the tie-down measurement projections 151 and tie-down points $400_{2a}$ through $400_{2g}$ along tie-down measurement projections 157. As can be seen in FIGS. 2c and 2d, SGT 401 through 407 can be generated by the operator cursor manipulation, with SGT 404 being the one SGT that is "correct" in that it is the best match to RET 500. As the acoustic operator manipulates the time/bearing andor range parameters, the displayed cursor updates on the plot, possibly sequencing through various SGT such as 401, then 402, and 403, and finally to 404 of FIG. 2c as the range is varied. Through manipulation of the variables, the operator is able to define a solution SGT 404 that best fits over the target's acoustic RET 500. With the Bscan raster RET 500 being the precise measured target time/bearing information, the operator is able, by the manipulation of time and bearing, to define a SGT that explicitly matches the acoustic Bscan raster RET 500. In principle, this eliminates all the abovedescribed tracker information problems. As with a single sensor motion track measurement data set, also known as "single leg TMA," the Raster MATE solution described is just a Direction of Relative Motion (DRM) solution, from which geographic position/motion cannot be determined. Under normal conditions, either a sensor relocation maneuver or a second non-co-located sensor array is required to resolve the target from a DRM solution to a unique X/Y solution state vector. A sensor relocation maneuver is a change to a new course or speed, as opposed to "motion of the sensor location" which is along the original track. This results in a second leg of information to be used with the first leg of information to resolve the targets solution. Using either multi-leg or multi-sensor data sources, target solution resolution is supported by the Raster MATE method. When supporting solution resolution by use of a sensor maneuver, the operator continues to conduct motion analysis using both legs of the target RET. When supporting solution resolution using a second, non-co-located array, the operator conducts motion analysis using both arrays' raster plots concurrently.

FIG. 3a illustrates a Cartesian coordinate system representation of a well-known or conventional method for processing good track measurements received from a radiating source through a sensor maneuver to focalize the target solution range, and for determining motion and range information from the bearing line information collected. The first section or leg of sensor measurements 151 through 157 where observed at points 111 through 117 respectively. After changing the original sensor direction of movement 101 to a new direction/speed combination 102 at time 17, a new set of sensor measurements are observed from sensor positions 118 through 121. Both target track projections, 200 and 300, had no observable error on the first sensor motion track associated with bearing projections 151 through 157 intersecting at points 211 through 217 for target 200 and 311 through 317 for target 300. Target Track projection 300 depicts the errors, 358, 359, 360 and 361, that would be observed by in incorrect theoretical SGT with respect to the energy measurements observed on the second leg of sensor motion. In that bearing projections 158 through 161 fail to intersect target 300 at points 318 through 321 respectively. The hashed boxes 358 through 361 represent the intersection error. Target Track projection 200 depicts a target track that had a correct assumption from the first leg and supported minimal error on the second leg. In that bearing projections 158 through 161 intersect target 200 at points 218 through 221 with little or no intersection error. A sensor maneuver, for this purpose, consists of a change of heading such as indicated in FIG. 3a by the two tracks 101 and 102 joining at a location 117. In this method, bearing lines are established in the data reception sequence. In this illustrative example, seven bearing projections 151 through 157, observed at locations 111 through 117, are established along track 101. A second sensor track 102 is established wherein receiving system 100 maneuvers to take measurements along the second track or leg. In this illustrative example, receiving system 100 changes from its initial direction of travel, represented as track 101, to a second direction of travel 102, such that data is received at new observation points, represented as 118 through 121. Bearing lines 158 through 161 depict the direction of arrival of energy from generation points 218 through 221, respectively, of the target. In this example, target 200 has not changed its course or speed during the maneuver. With the underlying assumption of a constant course/speed target, the projected intercept points of the target 200 track continue to maintain consistency, whereas the generation intercept points from target 300 track diverge, with increasing error, illustrated as hatched blocks 358 through 361. This "Error" can be observed between the track measurement 158 through 161 bearing projection and the corresponding target 300 theoretical positions 318 through 321 for the time of the track measurement. Both targets 200 and 300 had no observable error on the first sensor motion track 101. Target 300 provides a basis for illustrating errors 358 through 361. This conventional process is also applicable to the Raster MATE technique of conducting Target Motion Analysis.

Figure 3B:
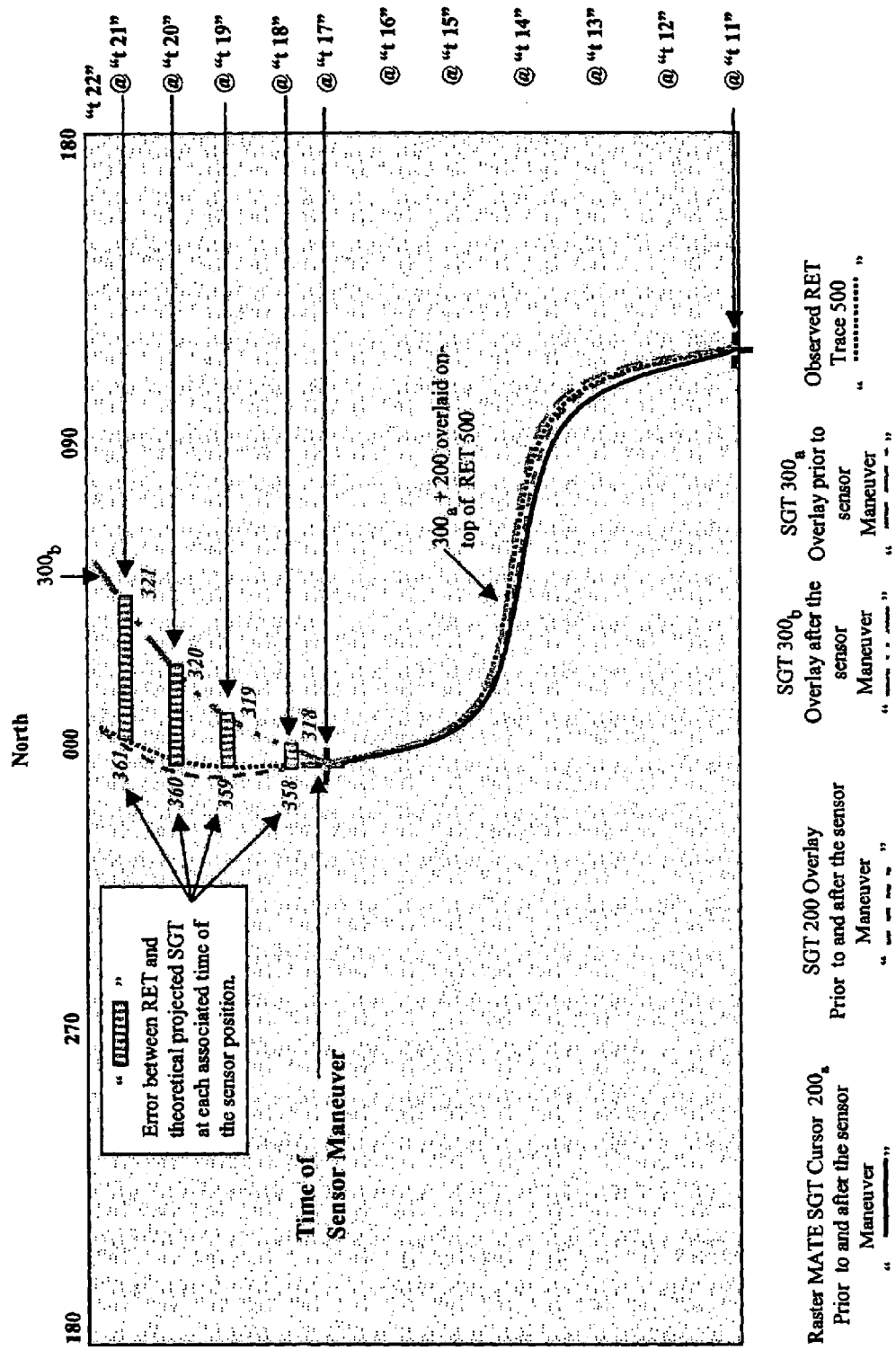
FIG. 3b illustrates an acoustic Bscan raster plot depicting the original first leg of information and the newly shifted lines of information received after the maneuver.

FIG. 3b illustrates an acoustic Bscan raster plot showing the original first leg of information and the new lines of information after the maneuver of the sensor array was complete. These new lines of information are observed from current time t22 back to the t17 time on the plot. The t17 time on the plot represents the time of the sensor motion change of direction. FIG. 3b depicts the RET 500 and displays a correct full plot SGT overlay 200 based upon the Raster MATE SGT cursor $200_a$ solution. This observation is of a possible SGT generated by the Raster MATE method through an array maneuver to focalize the target solution range as depicted in FIG. 3a. SGT $300_a$ associates to the first leg measurements 151 through 157, of the target track label 300 on FIG. 3a. The later portion of the SGT label $300_b$ associates to the second leg associated measurements 158 through 161. The observed errors 358 through 361 on FIG. 3a are depicted as the horizontal distance between the theoretical solution data points 318 through 321 and the actual RET 500 on the raster Bscan plot in FIG. 3b. This error is the result of incorrect assumption from the first leg being projected with respect to the second leg of sensor information. The error observed is based upon an incorrect tie-down point range assumption from the first leg of information; SGT 200 in FIG. 3a is observed in FIG. 3b as the correct solution and results in following the RET 500 as new lines are added to the plot FIG. 3b also depicts SGT 300, including SGT $300_a$ prior to the maneuver and SGT $300_b$ after the maneuver. As the operator manipulates the ranges of the Raster MATE SGT cursor $200_a$ the cursor solution is used to generate SGT 300 using the Raster MATE method, the resulting SGT $300_a$, $300_b$ will be established overlying the RET 500 of the target. The solution illustrated in FIG. 3b is of a possible SGT generated by the Raster MATE method through an array maneuver to focalize the target solution range. The SGT 200 in FIG. 3a is observed in FIG. 3b as the correct solution and results in following the RET 500 as new lines are added to the plot.

Figure 4A:
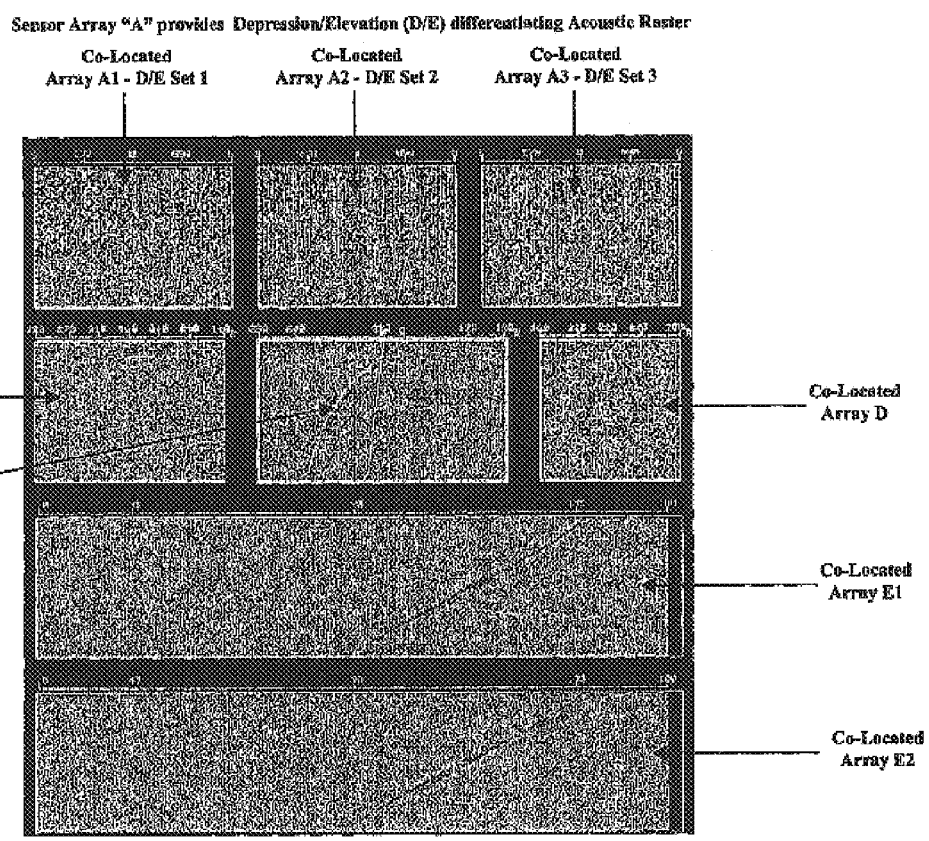
FIG. 4a illustrates an example of a multi-array acoustic Bscan raster display providing the ability to triangulate in the horizontal plane using various co-located and non co-located arrays.

In FIG. 4a, a Co-Located array is a sensor that is physically located within the structure of the measuring platform, and a Non Co-Located array is a sensor that is located at some distant position reporting the sensor measurements back to the measurement platform. By using these distant arrays the Raster MATE method supports motion analysis with respect to both the Co-Located and the Non Co-Located sensors simultaneously. The target could be observed at a different measurement on each of the plots over time. When supporting solution resolution by the use of multiple array sensors, the operator is able to triangulate from two (or more) non-co-located arrays to converge from a DRM solution to a unique state (X/Y, X/Y velocity, Time) vector. FIG. 4a depicts an example of a single display including plural panels which together support simultaneous viewing of acoustic raster data from multiple co-located and non-co-located sensors. Each plot represents time versus bearing of raster energy as observed at various different sensors. Thus, FIG. 4a represents a Raster MATE multi-sensor display. The three uppermost or "top" plots represent a ship's-bow-mounted array sensor acoustic coverage using multiple depression/elevation (D/E) angles. The top left plot, designated "D/E Set 1" depicts acoustic energy received on a positive D/E angle, the middle-top plot "D/E Set 2" depicts energy received on a zero-to-slightly-negative D/E angle, and the top right plot, designated "D/E Set 3" depicts raster energy received at a large negative D/E angle. The plot designated "Co-located Array B" depicts energy received on a forward/side hull-mounted array having receiving characteristics different from those of the bow array. These characteristic differences could provide energy level differences for the acoustic raster display plot. The center-right plot, designated "Co-located Array D" of FIG. 4a is for a top-mounted forward-looking array with a totally different set of receiving characteristics by comparison with the bow or hull-mounted arrays. Again, the array differences provide for the possibility that the target will be observed with one array when it might be invisible to others. The two large bottom plots of FIG. 4a, namely co-located array E1 and E2, depict a full 360-degree coverage around the sensor platform with an increased sensor resolution as compared to the bow, hull, or top mounted arrays. This increased resolution will provide an increased level of Raster MATE solution quality by comparison with the other bow, hull, or top platform-mounted sensors. The non co-located array C plot between the co-located array B plot and the co-located array D plot depicts raster energy received from a typical non-stabilized line array. A non-stabilized array generates acoustic reception beams that are conical in nature, whereas all platform-mounted arrays are stabilized and as such can create what is sometimes referred to as "pencil-tip" beams. Pencil-tip beams can define the exact direction or bearing to where the target's energy is being generated, while a conical beam only supports defining a cone of possibilities as the source of energy generation.

Figure 4B:
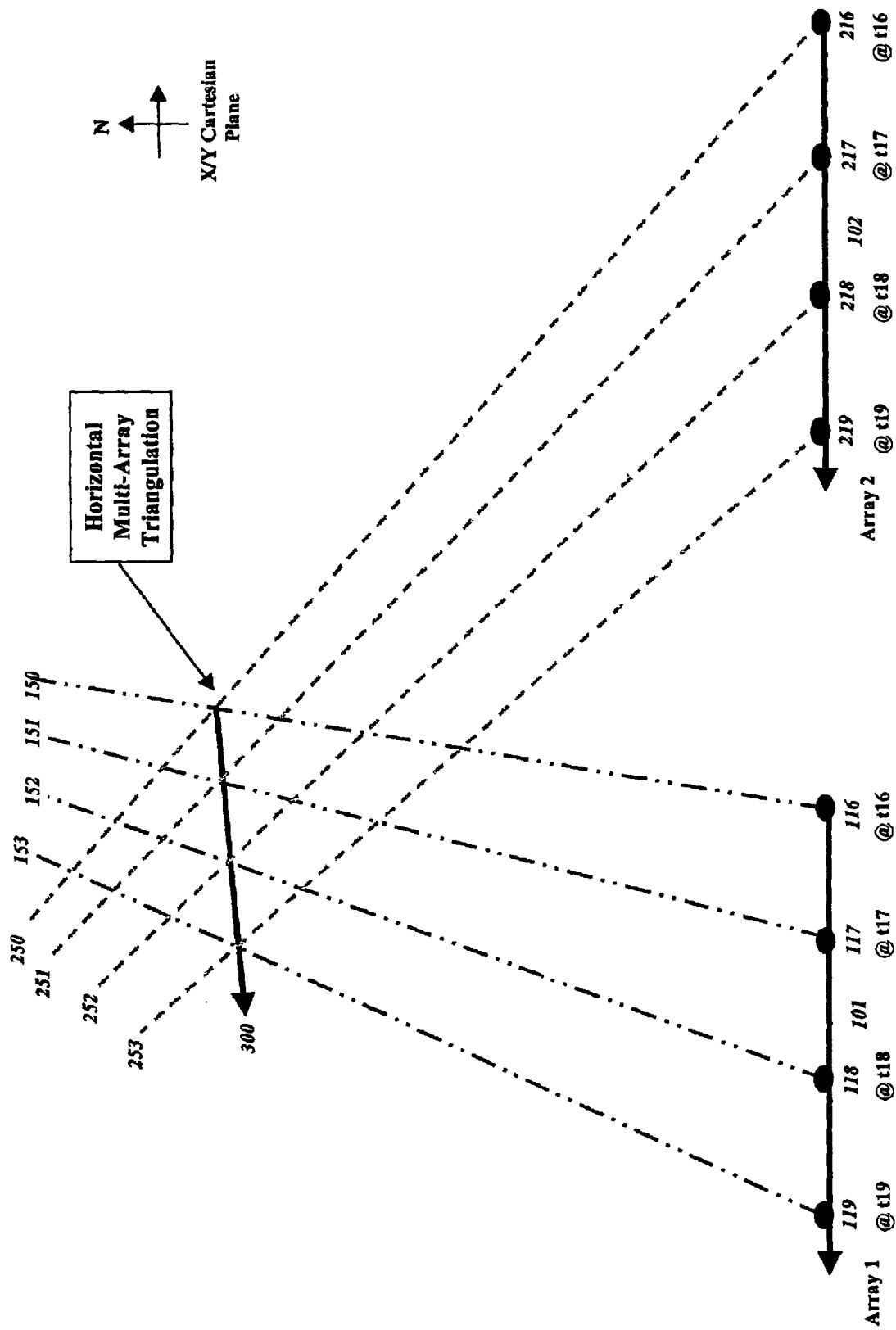
FIG. 4b illustrates a geographic Cartesian coordinate system representation of horizontal triangulation between two non co-located arrays.

FIG. 4b addresses the issue of observation of a single target's track over multiple non-co-located sensors. Measurements data from array 1 are observed at the same moments in time as the associated measurement data from array 2. The observations are matched sets of information. For example, measurement 250 was received at second sensor array position 216, at the same moment in time as measurement 150 was received at sensor array 1 position 116. Observing the two measurements with respect to sensor position provides the operator the ability to determine the single point where both projections cross, creating SGT 300. This dual measurement from two Non Co-Located array sensors provides a rapid method to determine a target position at the unique moment in time. This method of localization is sometimes referred to as target triangulation. Using the Raster MATE method allows the operator to conduct solution analysis using multiple real-time triangulations As FIG. 4b depicts, the target's solution track 300 can only exist at a single set of points in space when triangulating two raster time/bearing positions. Illustrated as Array 1 and Array 2 at times corresponding to t16 (116/216), t17

(117/217), t18 (118/218) and t19 (119/219) at bearing lines sets illustrated as 150, 151, 152, 153 and 250, 251, 252, 253, respectively, are observed with respect to the coordinate plane. As the operator adjust the target solution via the Raster MATE SGT cursor on the first array raster plot, an associated SGT overlay on the second array (non co-located with respect to the first array) raster plot is overlaid on the raster information, with respect to the array's unique sensor position. The updating of the Raster MATE SGT cursor on the first raster plot directly effects the overlaying of the solution on the second raster plot. This use of two differently located array raster information allows for rapid solution generation via a triangulation process along a SGT. This difference in raster representation of each array allows the operator to manipulate the Raster MATE solution to the triangulation point for each matched pair of measurements at a unique time, also known as a "sweet spot".

Figure 4D:
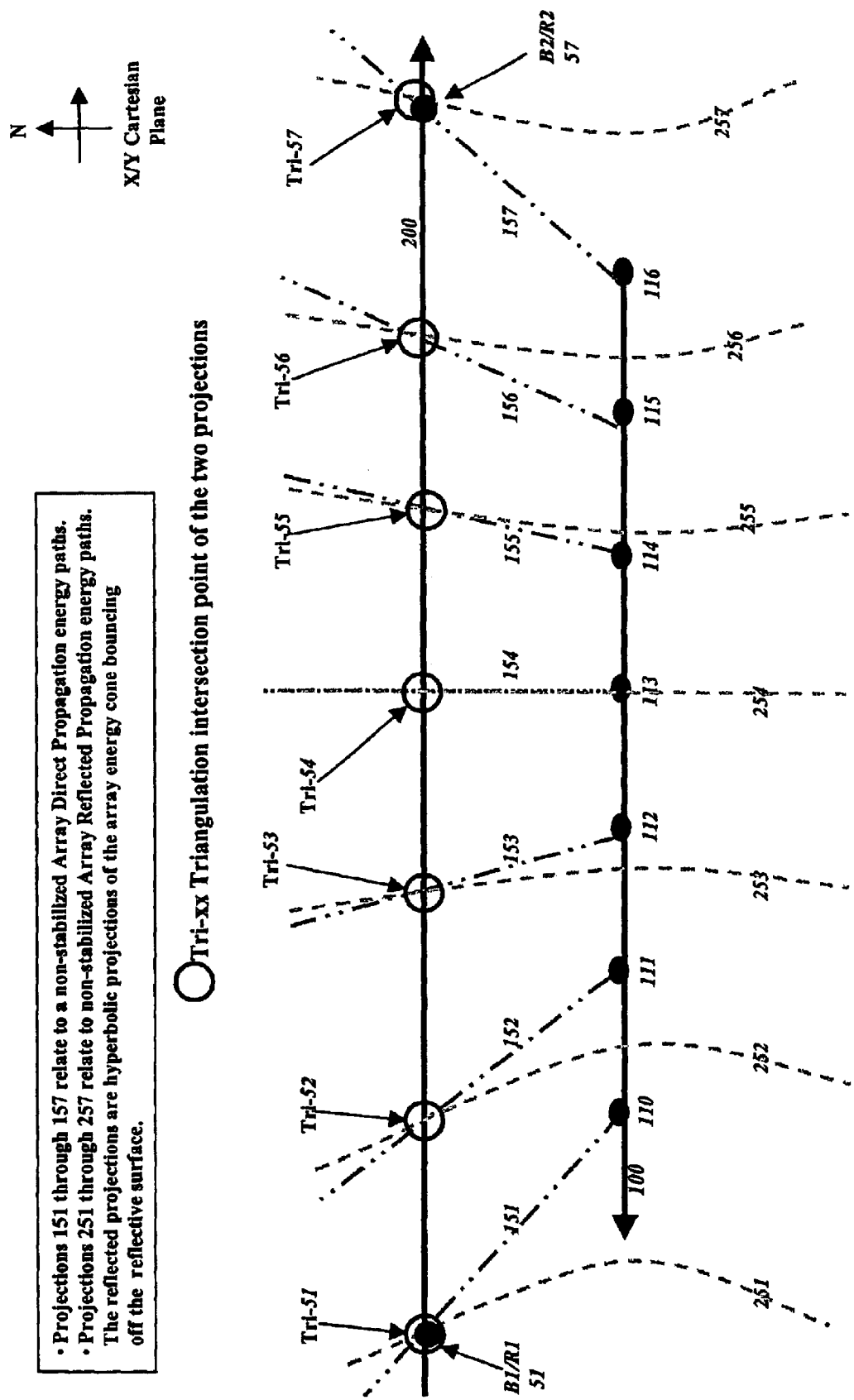
FIG. 4d illustrates a geographic Cartesian coordinate system representation of the bearing projections from a non-stabilized line array.

When supporting solution resolution by use of a single array, and the array supports accurate depression/elevation (D/E) measurements, the operator can triangulate between multiple propagation paths to converge from a Direction of Relative Motion (DRM) solution to a unique state (X/Y, X/Y Velocity, Time) vector. FIGS. 4c1 and 4c2 illustrates the nature of propagation path or vertical triangulation. When energy is propagated in a medium the method of travel may vary with differences in the environment. Energy observed from a path extending directly from the source to the sensor is referred to as a "direct path" observation, energy observed after bouncing from a reflective surface is referred to as "bounce," and may be "bottom bounce" in the case of reflections from the bottom of the fluid, "surface bounce" in the case of reflections from the surface, or "acoustic layer bounce" in the case of reflections from an interface between layers of water or fluid having different indices of refraction, which generally results from temperature differences. By observing the measured data via two or more paths including a bounce path, the Raster MATE method allows for a multiple-path triangulation technique. FIG. 4c1 illustrates the vertical plane representation of observed direct and bottom bounced path measurements, and FIG. 4c2 illustrates the vertical plane representation of observed direct and surface bounce path measurements. In FIG. 4c1, the direct path is designated 150, and the path that reflects from the ocean bottom or an acoustic sound-reflecting layer is designated 250. At both the sensor and at the radiated energy source, the direct and reflected paths are at different depression angles. In FIG. 4c2, the direct path is again designated 150, and the path that reflects from the surface or an acoustic sound layer is designated 350. In both cases, the energy arrives at the sensor from the radiated source via two simultaneous paths. Energy is received on a direct (approximately 0° D/E) path and on a reflected (large positive or negative D/E) path. The reflecting plane could be the ocean bottom, ocean surface, or an acoustic sound layer. For a non-stabilized line array beams are based upon conical angle energy. In the case of a line array, the conical angle (containing both D/E and array Cant Angle which is the associated pitch angle of the non-stabilized line array) received via a bottom bounce propagation path is observed as a hyperbolic projection. This hyperbolic projection is a result of the receiving cone intersection with the reflective surface. In FIG. 4d, projections 151 through 157 relate to line array direct path energy propagation observations, corresponding to path 150 of FIGS. 4c1 and 4c2, and projections 251 through 257 relate to reflected bounce hyperbolic energy propagation observations, corresponding to one of paths 250 or 350 of FIGS. 4c1 and 4c2 respectively. The hyperbolic projections are derived from a conical angle measurement intersection with a reflective surface prior to being received by a non-stabilized line array When conducting dual path Raster MATE methods of operation an operator picks a path of observed energy and initializes the Raster MATE SGT cursor over the energy trace. This cursor initialization is depicted geographically as aligning with the direct path projections 151 through 157 of FIG. 4d. The operator then varies the tie-down ranges of the cursor; B1/R1 at point 51 and B2/R2 at point 57 to define a SGT that supports minimal error for both the direct and bottom bounce paths of received energy. These minimal error points are observed as points Tri-51 through Tri-57 on FIG. 4d.

Figure 4E:
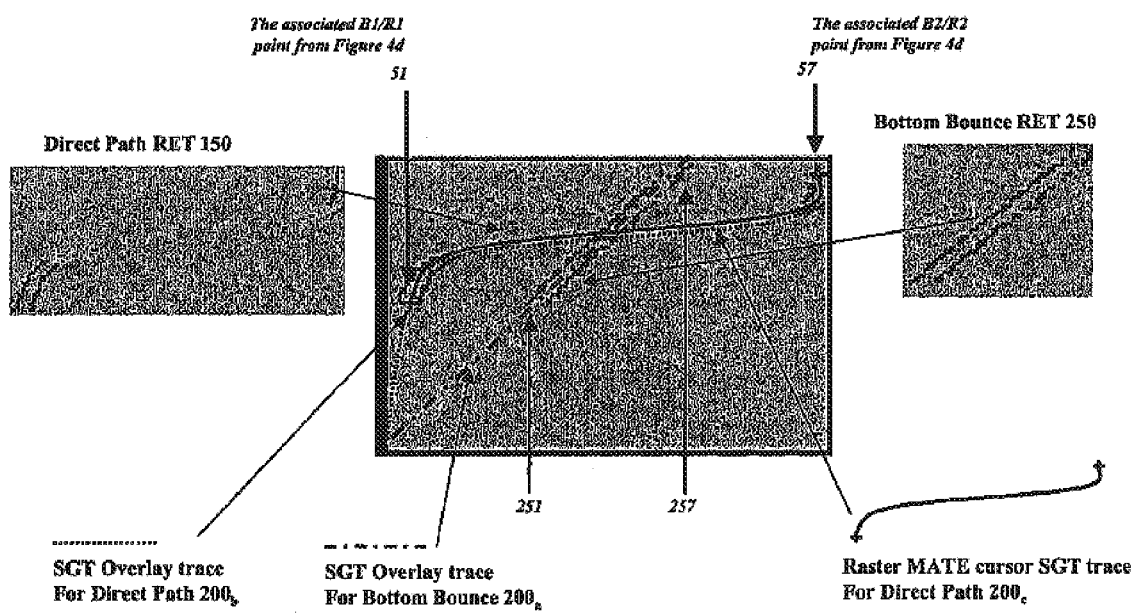
FIG. 4e illustrates an example of a non-stabilized line array's acoustic Bscan raster plot, and FIG. 4f addresses the observation of a single targets track over multiple Co-Located and Non Co-Located sensor platforms.

As illustrated in FIG. 4e, an example of this multi-path triangulation processing is observed on a Bscan plot. FIG. 4e illustrates an example of a non-stabilized line array's acoustic Bscan raster plot, which provides the ability to triangulate in the vertical plane using multiple arrival paths. In FIG. 4e, a direct path energy trace normally consist of high bearing rates from one side edge of the plot to the other side edge of the plot and bottom bounces energy trace are normally manifested as traces of lesser bearing rates observed in the middle of the plot. RET 150 was received from direct path propagation and RET 250 was received as a result of a bottom bounce propagation. The energy was transmitted at the same moment in time for each propagation path. For verification that the two energy traces emanate from the same target source an acoustic operator has other means, independent of the invention, to compare audio or tonal traces associated with the energy traces in order to verify that the energy traces are from the same target and simply received by different paths. A corrected SGT overlaid on the raster data defines where the target of interest is located (or could be detected) on the array over time. Raster MATE SGT cursor $200_c$ is used to define the tie-down times and bearings, which are points 51 and 57 on the direct path RET 150. While viewing the direct path RET 150, the operator defines the two tie-down points 51 and 57 (each defined by a time and a bearing) and then adjusts the ranges at the tie-down points, respectively, for the curve fit of the cursor $200_c$ to the direct path RET 150. The operator is able to observe the same target via a different sound path 250 on the same sensor array. In FIG. 4e, SGT overlay $200_b$ is displayed overlying the RET 150 for the direct path received energy and SGT overlay $200_a$ is displayed overlying the RET 250 for the bottom bounce path received energy. By manipulation of the two ranges at the tie-down points 51 and 57 on the Raster MATE SGT cursor $200_c$ of FIG. 4e, the operator is able to simultaneously derive a SGT $200_a$ which also overlays the RET 250 of the other sound path at points 251 and 257 (and all points inclusive). As FIG. 4d depicts, the target's track 200 can only exist at single points TRI-51 through TRI-57 in space when triangulating two raster time/bearing projections 151 through 157 with 251 through 257, respectively. This is also true when triangulating using two different paths of RET raster information. The acoustic Bscan raster plot of FIG. 4e provides the ability to triangulate in the vertical plane using multiple arrival paths. Energy was transmitted at the same moment in time from each propagation path. This multi-path reception provides the operator the ability to conduct a multi-path Raster MATE method that provides a SGT based upon fitting the intersection points of the two paths over time. As the operator adjusts the target direct path Raster MATE SGT cursor $200_c$ in FIG. 4e, the SGT overlay $200_a$ of FIG. 4e overlays the raster information with respect to the array's unique sensor position and the respective bottom bounce path propagation.

This difference in raster RET of the direct 150 and reflected 250 sound paths as observed in FIG. 4e allows the operator to manipulate the solution to the triangulation "sweet spot" as observed in FIG. 4d including points TRI-51 through TRI-57. The tie-down and curve fitting of the direct path trace is accomplished using the above-described Raster MATE SGT cursor method. Once a fit is achieved between the observed direct path RET 150 and the cursor $200_c$ the operator then adjusts both the tie-down ranges R1 and R2 along the bearings 151 and 157, respectively, keeping the curved fit on the direct path RET 150 with cursor $200_c$ until solution overlay $200_a$ fits or overlies the RET 250 for the bottom bounce received energy. This iterative method allows the operator to groom the Raster MATE solution such that it overlays the RET on more than just a single path. When this method is used a single triangulation MATE solution state vector (X/Y, X/Y Velocity, Time) is generated which contains more than just a traditional triangulation Range and Bearing.

Figure 4F:
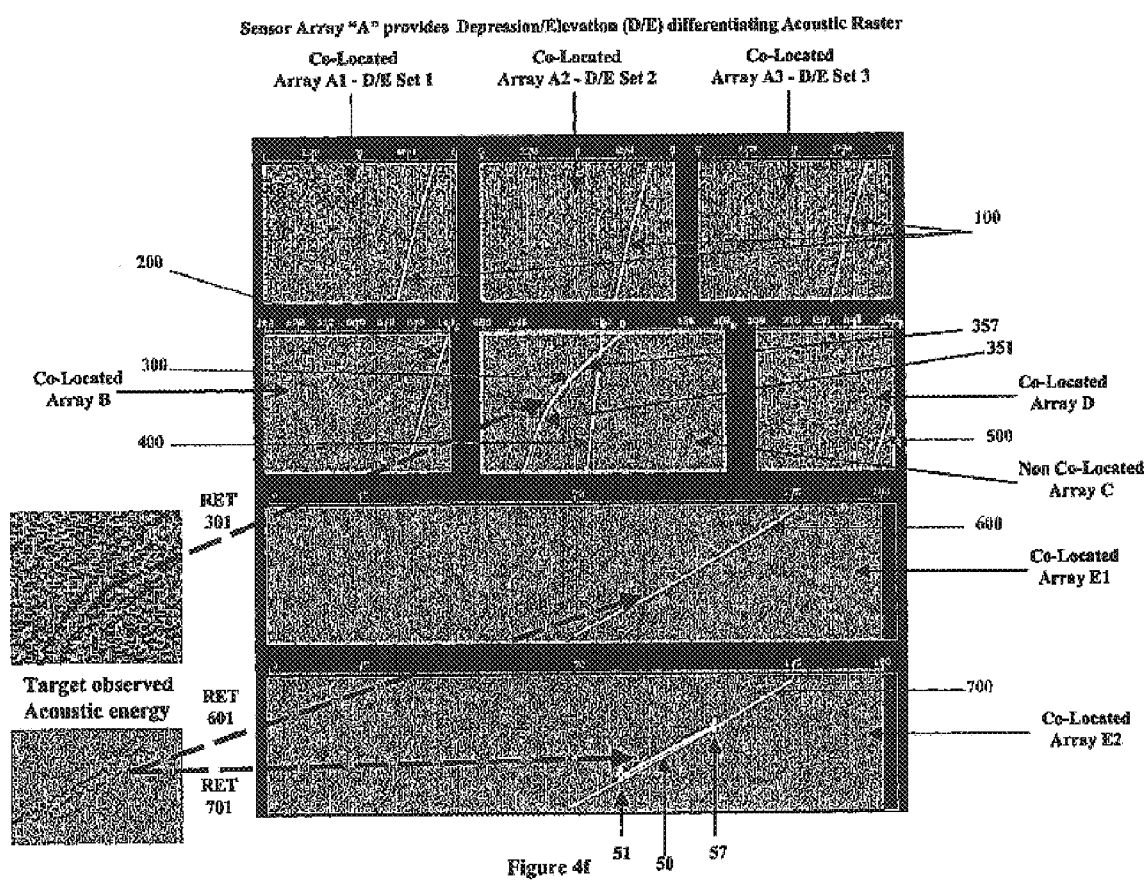

FIG. 4f illustrates an example of the non co-located array triangulation processing. All the plots of FIG. 4f are of the same nature and characteristics as those discussed in conjunction with FIG. 4a. The SGT overlay lines 100, 200, 300, 400, 500, 600, and 700 show the projected current Raster MATE SGT cursors solution overlays for each sensor array. The Raster MATE SGT cursor 50 is the line segment with cross-hair end points located in the lowermost co-located array E2 plot and lying between points 51 and 57 and is used to compute sensor origin corrected solution overlays for the other plots. As illustrated in FIG. 4f, the Raster MATE method allows the operator to define a Raster MATE SGT cursor 50, (as described in FIGS. 2b through 2d) on one of the array plots and the projection of the corresponding SGT overlays 100, 200, 300, 400, 500, 600, and 700 onto their respective plots. The projected SGT overlays 100, 200, 300, 400, 500, 600, and 700, respectively, are based upon a single solution computed by the Raster MATE SGT cursor and corrected with respect to the array's sensor reference points and for the array shape (yaw, pitch, and roll) as required. The Raster MATE SGT cursor 50 on the co-located array E2 plot is used to define the tie-down times and bearings, points 51 and 57. Observing the RET 701 on the co-located array E2 plot in FIG. 4f, the operator defines the two tie-down points 51 and 57(time & bearing) and adjusts the two tie-down ranges causing the curve aspect of the Raster MATE SGT cursor 50 to fit to the curve aspect of the RET 701 observed in the raster. With the Raster MATE SGT cursor 50 curve fitted to the RET 701 the operator then observes other co-located arrays A1, A2, A3, B, D or E1 for a matching fit of the SGT overlays, 100, 200, 500, and 600 generated based upon the Raster MATE SGT cursor 50 solution. This comparison of the co-location plot of one array to a plot of another co-location array provides to the operator a means of insuring a proper fit to the observed energy traces. With the Raster MATE SGT 50 fitted to the RET 701 the operator observes the contact on a non co-located array C. In this case the non co-located array C is depicting direct path energy propagation RET 301. By manipulation of the two ranges at the tie-down points on the Raster MATE SGT cursor 50, the operator is able to derive a SGT overlay 300 which also overlays the RET 301 on the non co-located array C at points 351 and 357, and all points between. In this case the non co-located array is a non-stabilized line array showing a RET 301 for the direct path energy propagation. The operator alignment of the SGT on the non co-located array C is with respect to the observed propagation path. The resulting solution fits the co-located RET 601 and RET 701 and the non co-located RET 301.

Figure 6:
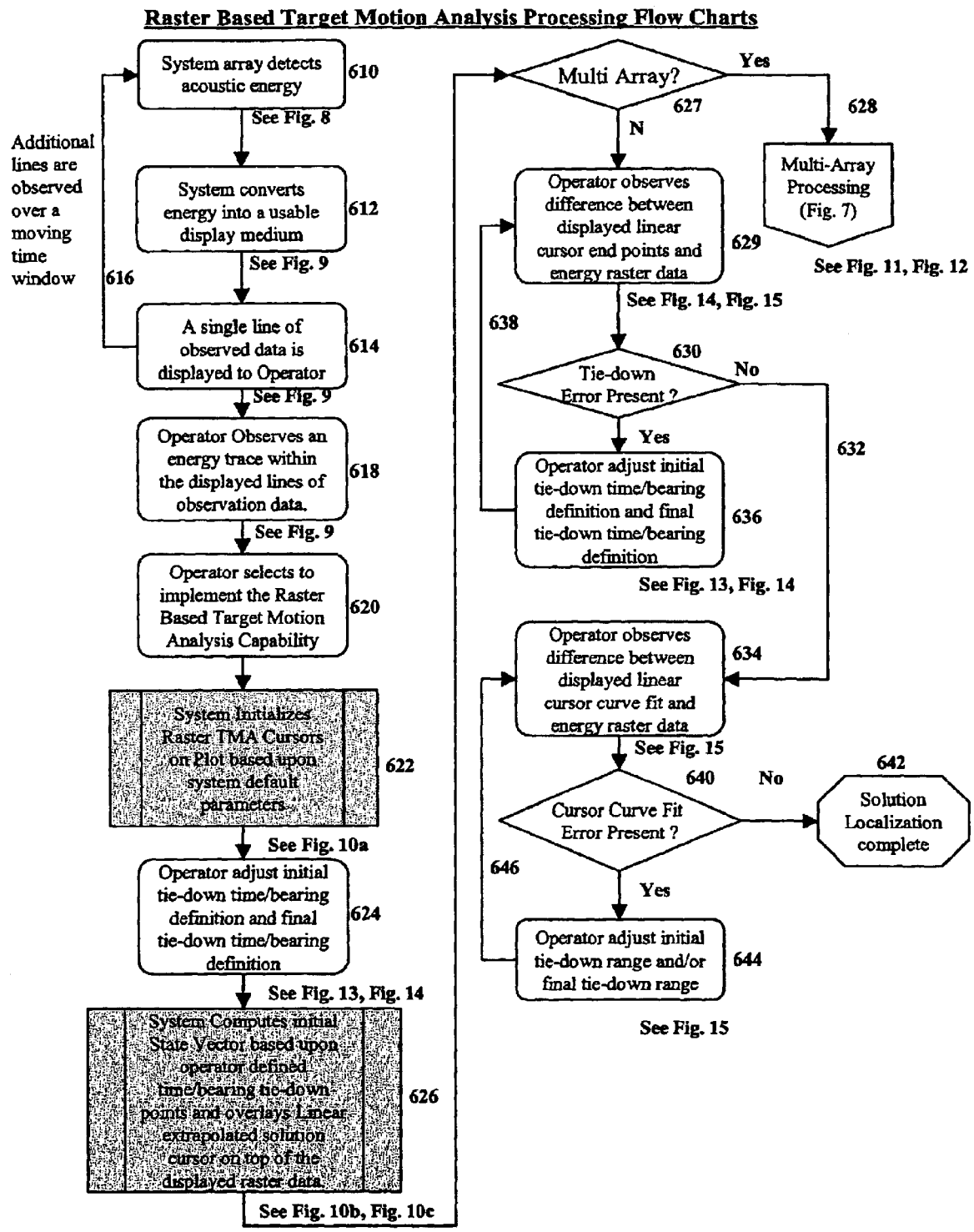
FIGS. 6 and 7 illustrate the processing flow and operations associated with extrapolating a target's solution by use of the Raster Based TMA method.
Figure 8:
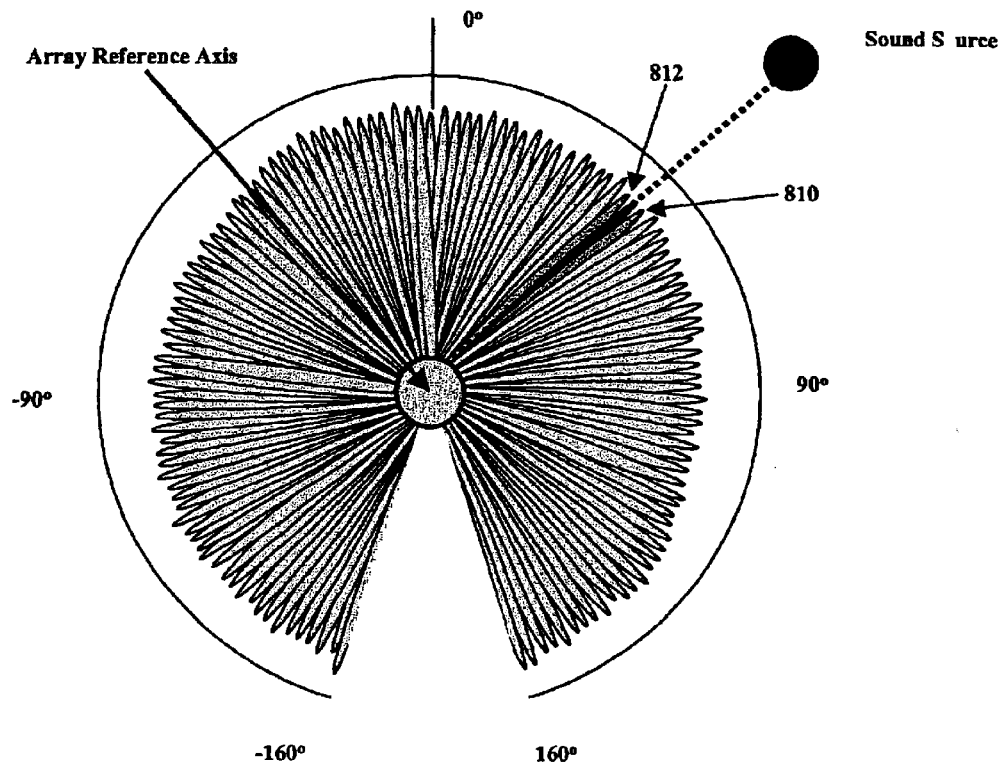
FIG. 8 illustrates an example of a spherical array sensor and the generated beam for receiving acoustic energy from −160° to +160° with reference to the array orientation axis.
Figure 9:
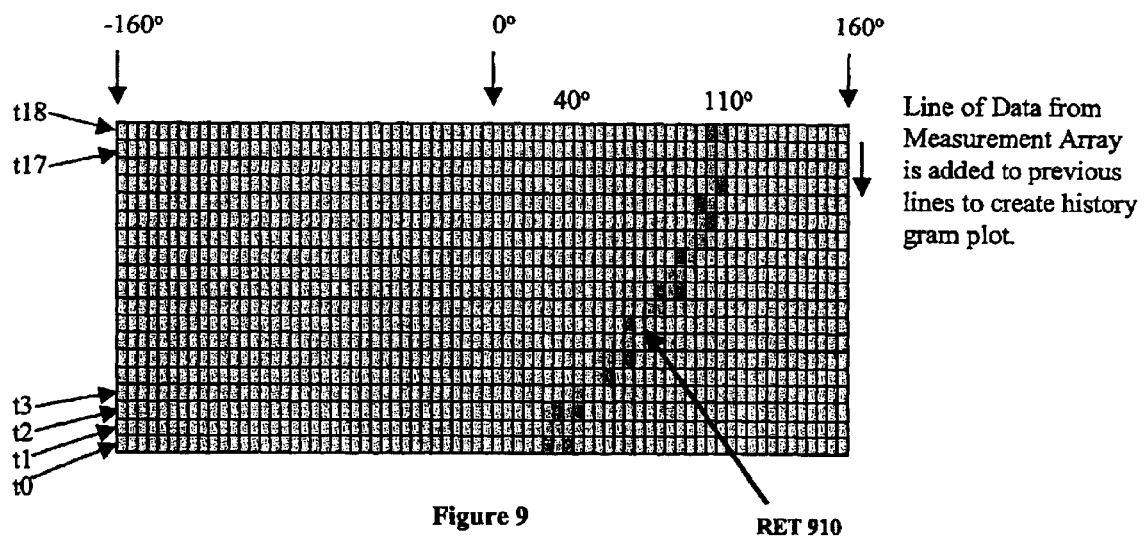
FIG. 9 illustrates the Bscan representation of the acoustic received energy from the beam set of FIG. 8.

FIGS. 6, 7, 8, 9, 10a, 10b, 10c, 11, 12, 13a, 13b, 14a, 14b, 15, 16a, 16b, and 16c illustrate the processing flow and operations associated with determination of location information associated with a contact according to an aspect of the present invention. The displayed logic is operational logic, which includes actions taken by the operator as well as automatically generated actions. Referring first to FIG. 6, the operational logic insofar as relevant starts at a block 610, which represents the detection of acoustic energy by the acoustic array. FIG. 8 represents the response in polar coordinates of a representative acoustic spherical array of hydrophones. In FIG. 8, the array beams are illustrated as radial projections from a central array reference axis. The coverage of this array in the illustrated plane is from −160° to +160° with respect to the array orientation axis. The width of the beams is a function of the acoustic signal processing and beamforming processes supported by the system. In FIG. 8 the energy source is being received on beam 811 located between beams 810 and 812. The main energy received is observed by beam 811 with residual energy being received on beams 810 and 812. The relative angle of reception is in reference to the heading of the sensor array, which is annotated as the 0° reference point. Those array beams which are directed toward a sound source will respond, as suggested by the hatching associated with two array beams 810, 812 from block 610 of FIG. 6, the method flows to a block 612, which represents conversion of the received energy into a usable display. From block 612, the flow goes to a block 614, which represents the display of a single display or raster line of information, associated with the earliest time at issue. To provide for display of additional lines in a moving time window the logic or flow returns to block 610 by way of a return path 616. FIG. 9 represents a "B-Scan", "BitScan", "Waterfall", or "Raster" received energy based plot of time versus bearing (beam) energy, with energy as a display intensity parameter, based on the beam set of FIG. 8. This is a time-versus-bearing plot, with time on the vertical axis, and bearing along the horizontal axis. Each horizontal row of rectangular blocks represents a collection of beam energy received data at a specific moment in time. The highlighted or hatched rectangular blocks in each horizontal row represent the beam received information in an order from the left-most relative beam (−160°) moving right to the center relative beam. (0°) and continuing to the right and ending at the right-most relative beam (+160°) as observed from the sensor reference axis point. At each moment in time a more current line of information is added to the top of the plot of FIG. 9, and the existing lines shift downward, with the oldest line being shifted out of the observable window, in a waterfall display. This movement of the lines of data in a specific direction from latest to oldest is referred to a "Water falling" plot. Where target energy is observed an increase in the color or intensity of the color is depicted in the plotted data. The received target energy over time creates an energy trace depicted as RET 910 in FIG. 9. The plot in FIG. 9 depicts the original energy observed in line t0 as presented in FIG. 8. As motion occurs between the contact and the sensor platform the energy's bearing of reception will change. This change is observed by the RET 910 from the original bearing of approximately 040 to the latest bearing of approximately 110. The display corresponding to FIG. 6, block 614 is the top horizontal line at t18 of the display of FIG. 9, and each next lower horizontal line represents a later time. The most current time line of information is located at the top of the plot and the oldest is at the bottom. A "feedback" line 616 in FIG. 6 represents the iteration of the display of energy at successive times t0, t1, t2, . . . , t17. The continuous iteration around blocks 610, 612, 614, and return path 616 of FIG. 6 produces continuous water-falling plot as depicted in FIG. 9. As illustrated in FIG. 9, the bearing of the principal received energy changes over time, in this case from about 40° at time t0 to about 110° at time t17. From block 614 of FIG. 6, the Raster MATE method flows to block 618. Block 618 of FIG. 6 represents the observation of the display by the operator. Thus, at each moment in time, a snapshot of hydrophone energy is processed via a signal conditioner, signal processor, and/or beamformer ("processor") to provide a single line of graphical data for display, as in FIG. 9. The data is quantified by an energy level scheme such that the operator observing the data can ascertain a difference in received energy levels measured with respect to the array's sensor reference point. Each bit of data on a single line represents the energy observed at the sensor's relative position.

Figure 10A:
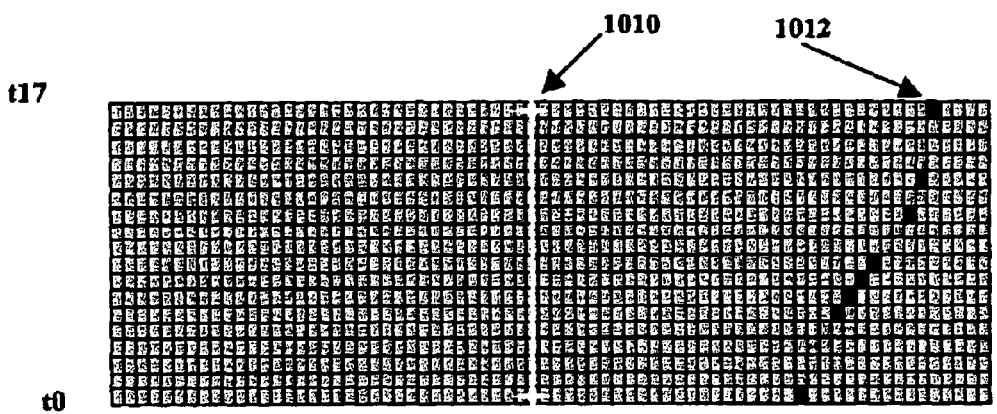
FIGS. 10a, 10b, and 10c illustrate the initialization of the Raster MATE SGT cursor and the resulting cursor positioning based upon operator interaction of the cursor tie-down points annotated as the cross-hair configuration at the ends of the cursor.

Block 620 of FIG. 6 represents selection by the operator of the Raster-Based Target Motion Analysis mode of operation. The raster-based method of Target Motion Analysis is able to use an interactive cursor to support the generation of a solution by the operator from the raster information, so long as the raster data is not pure noise, but includes a contact observed within the display as being a linked over time, with the information trace at a higher energy than background noise. From block 620 of FIG. 6, the operation flows to a block 622, which represents the initialization of the Raster MATE system, placing cursors on the plot based on system default parameters. There are various methods that could be used for initialization of the cursors. Initiaiization of the cursor could be to a default position or it could be based upon previous knowledge of the target solution. For default initialization, the cursor is positioned to the midpoint of the plot, awaiting operator intervention. The operator then controls the end points and provides modifications to cause the cursor fit to the observed RET. A second method of initialization for a Raster Based system would be to initialize to a previous solution for the target of interest if such as solution exists. This solution information on the target of interest could be projected to the time of the raster lines and displayed overlying the location at which the projected track at the time of the raster line. This method of system initialization would automatically attempt to position the cursor to the RET. Of course, such a method of initialization only works if the new RET information corresponds with the projected solution information. If the target has maneuvered, or the old solution was incorrect, the Raster MATE SGT cursor would not initialize overlying the RET. The default method of initialization is preferred. FIG. 10a depicts an acoustic Raster MATE plot as described in conjunction with FIG. 9 with the observed RET 1012 and the Raster MATE SGT cursor 1010 initialized to the mid point of the plot.

Figure 10B:
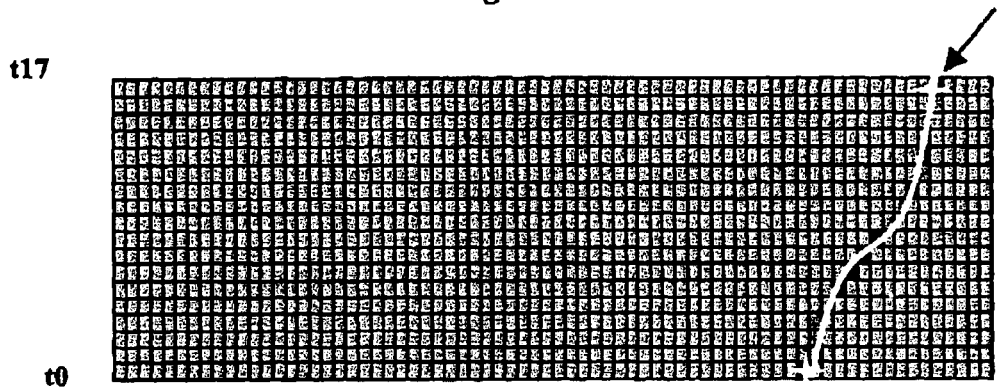
Figure 10C:
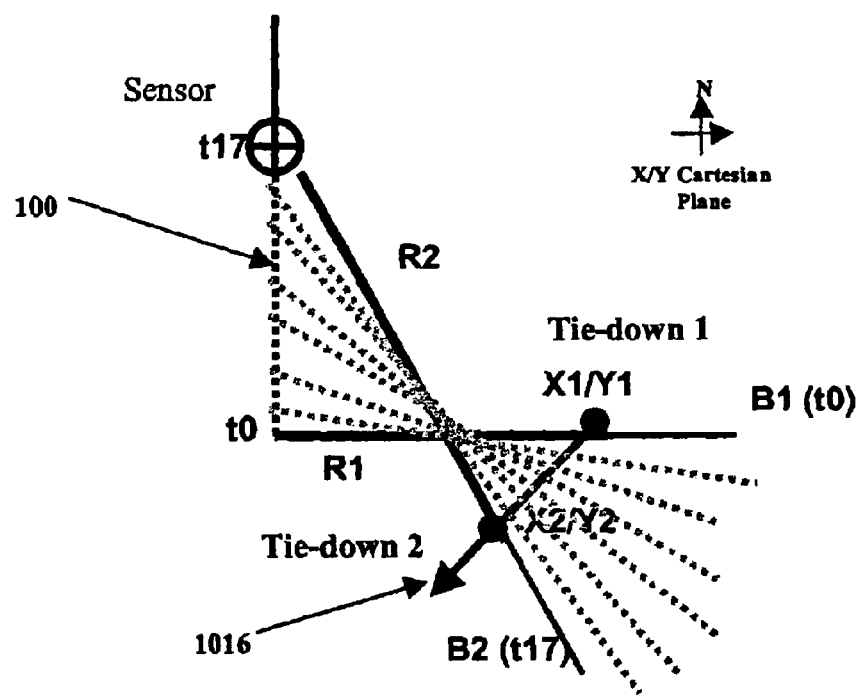

From block 622 of FIG. 6, the operation flows to a block 624, which represents selection by the operator of the time and bearing raster points of interest, which will generally be the at the beginning (t0) and end (t17) of the trace. FIG. 10b depicts the resulting position of the Raster MATE SGT cursor 1014 after the operator has manipulated the tie-down end points and the tie-down ranges to fit the cursor to the observed RET 1012. FIG. 10c depicts a geographic orientation of the Raster MATE SGT cursor solution. The sensor motion 100 is a north direction from t0 to t17. At respective moments in time the sensor position is noted and a bearing projection from the sensor to the contact is observed. The bearing projections are depictions of the bearing of the raster energy cell that contained the highest energy level (RET) with respect to the associated raster line of data from FIG. 10b. The contact solution projection 1016 is a geographic representation of the Raster MATE SGT cursor 1014 from FIG. 4b. The contact solution 1016 is projected from the t0 bearing/range with respect to the t0 sensor position of the operator defined solution to the t17 bearing/range with respect to the t17 sensor position. This Raster MATE solution 1016 depicts what the resulting operator manipulated solution 1014 will look like in the geographic x/y coordinate plane. The adjustment of the bearing of the second tie-down point on the raster display is illustrated in FIG. 13a by the double-headed arrow B2(t17). FIG. 13b is a geographic plot of bearing projections illustrating the meaning or effect of the adjustment illustrated in FIG. 13a. In FIG. 13b, the target RET is displayed in a geographic representation. In FIG. 13b, the location of the sensor is illustrated by a cross-in-circle designated "sensor", and reference bearing at t4 is designated B1. The sensor motion is observed as the dotted line extending between points t4 and t17. Two tie-down bearing projections are displayed at t4 and t17. Ranges R1 and R2 represent the range from the respective sensor out along the tie-down projection to the tie-down point on the projection. Identifying two unique tie-down points results in the creation of a target track. The tie-down point associated with bearing line B2 is observed as a bearing projection from the sensor position t17 out and past the contact. The tie-down point 1314 is located along the tie-down bearing out at a range R2 from the sensors position at t17. Adjustment of the bearing on the raster plot of FIG. 13a at time t17 would cause the bearing of the tie-down projection to be modified. This modification is observed as the angular change in the tie-down bearing projection and in turn modifies the target solutions 1316 to either 1310 or 1312, based upon the direction of angular change. The adjustment of the bearing B2(t17) which is illustrated in FIG. 13b can be seen to change the trend line of the target bearing from the solid line designated 1316 to the dotted line designated 1310 or 1312, depending upon a positive or negative delta to the tie-down bearing. FIG. 14a represents by a double-headed arrow B1(t4) possible adjustments of the time parameter associated with bearing B1 at the first tie-down point. FIG. 14b is a geographic plot corresponding to plot 14a, showing the effects of changes of the time parameter on the first bearing trend line. In FIG. 14b, the target track is displayed in a geographic representation with bearing projections from the tie-down sensor positions as described in conjunction with FIG. 13b. The tie-down point associated with B1 is observed as a bearing projection from the sensor position t4 out past the contact. The tie-down 1414 is located along the tie-down bearing at a range R1 from the sensor position at t4. Adjustment of the tie-down time on raster plot FIG. 14a at time t4 would cause the time and bearing of the tie-down projection to be modified. This modification is observed in FIG. 14b as the change in the tie-down bearing 1414 along the target track to either 1412, if the B1 cursor's position is moved up the plot in FIG. 14a, or 1410 if the B1 cursor is moved down the plot in FIG. 14a. The upward or downward movement in the raster plot of FIG. 4a changes the tie-down point in time, sensor associated information, and bearing projection.

In FIG. 15, the target track is again displayed in a geographic representation with bearing projections from the tie-down sensor positions as described in conjunction with FIG. 13b. The tie-down point associated with B2 is observed as a bearing projection from the sensor position t17 out past the contact. The tie-down 1514 is located along the tie-down bearing at a range R2 from the sensor position at t17.

Adjustment of the tie-down range 1514 along the bearing projection B2 allows the operator to modify the observed target solution; reducing the range to the 1510 tie-down changes the target's displayed course to the left, and increasing the tie-down range to 1512 changes the displayed target course to the right. Since only the range is changing, no change to the tie-down time or bearing is observable on the raster. Modification to the tie-down range 1514 causes the Raster MATE SGT cursor to curve. This curvature of the cursor allows the operator to fit the cursor to the RET.

Once the operator has made the initial tie-down bearing and time definitions as suggested by block 624 of FIG. 6, the operation flows to a further block 626, which represents processing to compute the initial state vector, and overlay on the displayed RET a linearly extrapolated solution cursor. The system processing for computation of the state vector depends upon the operator defined time/bearing/range tie-down points, and is an iterative process providing positive feedback to the operator with respect to the error between the derived solution by direct comparison with real data, namely the RET. The process uses an initial State Vector defined by the two end-points (X1/Y1 and X2/Y2 coordinates). A delta target motion difference with respect to the delta in time results in computing the velocity terms for the associated State Vector.

In previous FIGS. 10*b*, 10*c*, 13*a*, 13*b*, 14*a*, 14*b* and 15 the operator is provided a Raster MATE SGT cursor defined by two endpoints and manipulated by time/bearing/range changes to the respective endpoints. This cursor defines a unique contact solution that is then projected as a SGT overlay on the existing or other raster plots for comparison of the solution over time to the RET observed in the raster over time. The generation of the SGT overlay solution is based upon a single state vector. This vector is defined as a x/y coordinate set, an x/y velocity term set and a time associated with the x/y coordinate set. The process of generating the SGT overlay on a raster plot is elaborated in FIG. 16*a*, FIG. 16*b* and FIG. 16*c*. FIG. 16*c* depicts a geographical representation of a sensor platform moving in a northerly direction and a contact being defined as a unique range and bearing from the sensor at a moment in time (t17). Using the contacts state vector information (x/y coordinate, x/y velocity terms, and time) the system extrapolates the solution forward or backward in time to determine the contacts bearing from the associated sensor position at the time of a raster line. FIG. 16*b* depicts a projected contact SGT based upon the projection of the original solution x/y coordinate, x/y velocity terms and the time of the solution. FIG. 16*a* depicts a raster plot showing a contacts RET and the SGT overlay based upon the projected contact SGT of FIG. 16*b*. The contact solution in FIG. 16*c* is composed of an x/y coordinate position in a coordinate system plane, velocity terms associated with x and y movement and the time of the coordinates along the target track. This single point x/y coordinates/time is used to determine the target's position at any point along the target track as depicted in FIG. 14*b*. The determination is performed by use of a basic linear extrapolation algorithm. A delta time is observed from the time of the solution (t17) to the time of the desired raster line (t10) on the display (t17–t10). This delta time is used with the velocity terms (x units per second or y units per second) to compute delta x and y terms. The delta x and y terms are then added to the original x and y solution coordinates 1617 to determine the solution coordinates 1610 at the time of the raster line. Using the projected target coordinates 1610, a bearing is then computed based upon the sensor position at the time of the projection t10. This bearing projection is sensor corrected with respect to Roll, Pitch, and Yaw of the sensor platform at sensor time t10. The process then determines which energy beam should contain the theoretical energy from the emitting contact. This beam information for the specific time t10 is then maintained and used in conjunction with other beam-versus-time information computed for each additional line of raster data. Linking all of the beam/time data results in a fluid, interactive cursor line being displayed to the operator. By observing this beam/time line segment compared to the underlying raw raster energy, the operator is able to quickly assess if the solution of the contact is the respective solution that supports the energy source that created the raster energy.

Decision block 627 of FIG. 6 routes the flow of the operation to a node 628 designated "Multi-Array Processing" for those cases in which more than one sensor array is used. When a single array is used, decision block 627 routes the operational logic to a block 629, which represents observation by the operator of the differences between the displayed received energy raster data and the linear cursor end points from the calculated solution. From operation block 629, the operational logic flows to a decision block 630, which routes the operational logic depending upon the presence or absence of error between the tie-down points of the received energy and calculated solution cursor. If there are no errors, the operational logic flows by way of a path 632 to a block 634, which represents a further review of any differences between the RET and the calculated solution cursor. If there are errors, decision block 630 routes the operational logic to the operator, who in response adjusts the time-bearing definitions of the initial and final tie-down points. From block 636, the operational logic flow returns by way of a path 638 back to block 629. The iteration around blocks 629, 630, 636, and path 638 continues until such time as the operator has adjusted for little or no difference between the displayed received energy and the calculated solution cursor tie-down points. Once this is achieved, decision block 630 routes the operational logic to block 634 for final review by the operator. From block 634, the operational logic flows to a further decision block 640, which, in the absence of observed errors, directs the operational logic to a block 642, representing completion of the solution localization. If there are errors at decision block 640, the processing routes the operational logic by way of a path 646 back to the operator, who in response adjusts the tie-down range values of the initial and final tie-down points. This, in turn, will modify the curve exhibited by the cursor. From block 644, the operational flow returns by way of a path 646 to block 634. The iteration around blocks 634, 640, 644 and path 646 continues until such time as the operator has adjusted for little or no difference between the displayed received energy and the curvature of the solution cursor. The described interactive feedback process allows the operator to incrementally adjust the solution tie-down attributes in order to minimize cursor-to-raster energy differences. When all differences between the cursor and the observed energy are minimized, the operator has achieved generation of a valid Direction of Relative Motion (DRM) solution when operating on a single array with no sensor maneuvers.

Returning now to a consideration of those situations in which plural acoustic array sensors are used rather than a single array sensor, the operation of the flow chart of FIG. 6 is as described above for a single acoustic array, until the flow reaches decision block 627. Decision block 627 routes the operational flow by way of its YES output to a Multi-Array Processing node 628, which couples to FIG. 7.

Figure 7:
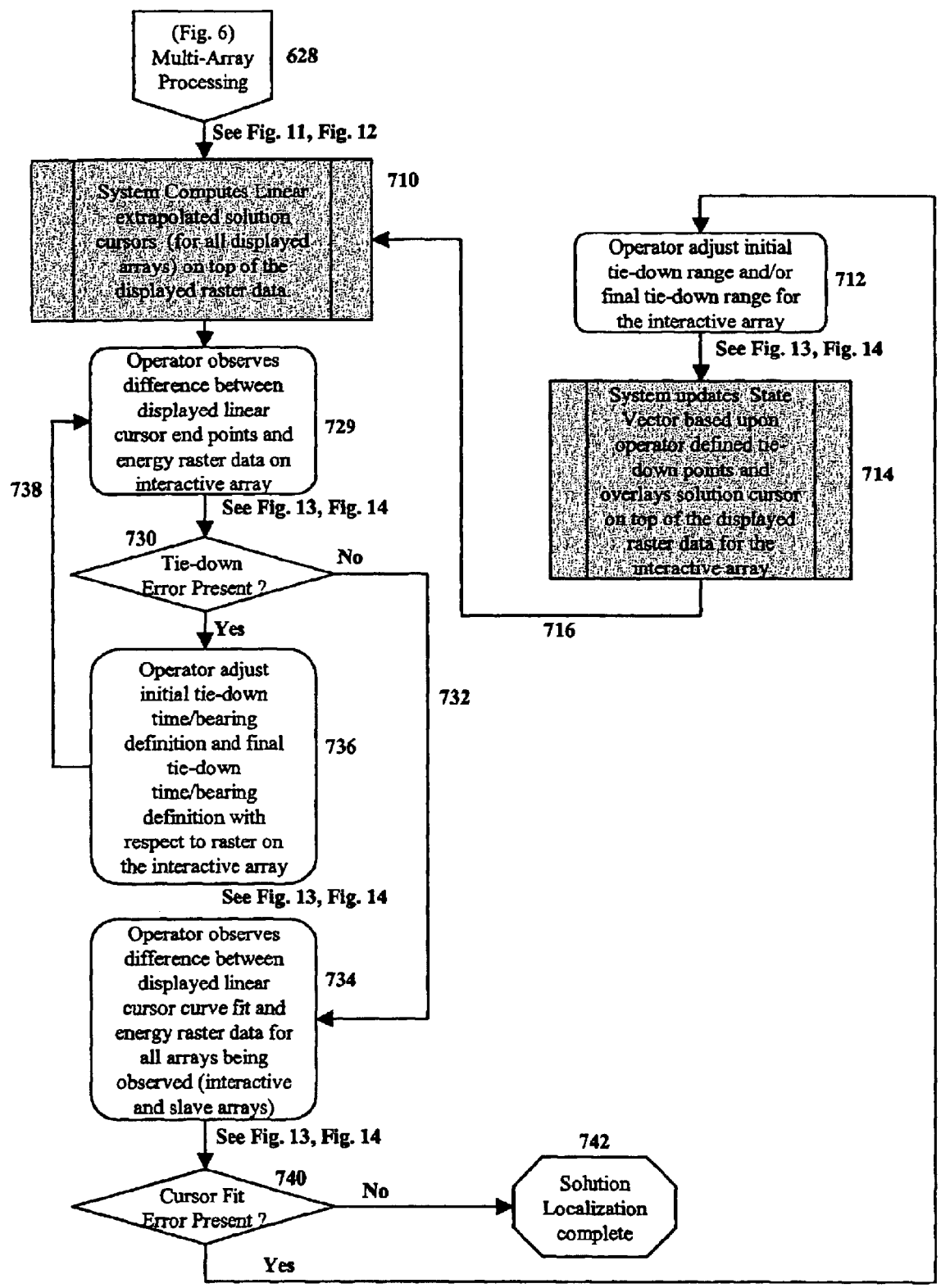

In FIG. 7, Multi-Array Processing node 628 couples the operational flow to a block 710, which represents computation by the system of a linear extrapolated solution for each of the acoustic arrays, and the overlaying of these extrapolated solutions onto the received energy for display. From block 710, the operational logic flows to a block 729, which performs much the same function as block 629 of FIG. 6, in that it represents observation by the operator of the difference(s) between the displayed extrapolated cursor end points and the received energy raster data. From block 729, the logic flows to a decision block 730, which determines if the operator indicates that a tie-down point error exists between the displayed extrapolated cursors and the RET. If not, the operational logic proceeds by way of the NO output to a block 734. If there is in fact an error, the operational logic proceeds by way of the YES output a block 736. Block 736 represents operator adjustment of the time/bearing definition of the cursor in order to reduce the error of the tie-down points to the received energy track. From block 736, the logic flows by way of a feedback or recursion path 738 back to block 729. The operational logic continues to flow or iterate around the operational logic loop including blocks 729, 730, 736, and path 738 until such time as the tie-down point error is reduced to a level which is acceptable to the operator, at which time the operational logic leaves the iteration path by way of the NO output of decision block 730, and flows by way of path 732 to block 734.

In block 734 of FIG. 7, the operator observes the difference between the solution-generated overlays and the received energy, and determines if the overlays fits or aligns to the associated array's energy trace. It should be noted that simple overlay at the tie-down points do not necessarily result in overlay of the entire solution on the RET. If it should happen that there is a fit, the operational logic flows from the NO output of decision block 740 to an end node 742, designated Solution Localization Complete. If, as will generally be the case, there is an imperfect overlay of the solution generated track on the received energy track, the operational logic leaves decision block 740 by way of the YES output, and flows to a block 712, which represents adjustment by the operator of the range at the initial andor final tie-down point(s). From block 712, the logic flows to a block 714, which represents updating by the system of the State Vector, based upon the operator-selected tie-down points, and display of the resulting SGT overlays on all raster plots. From block 714, the logic returns by way of a return path 716 to block 710. While the description of the operational logic is long, the actual operation of the system is virtually instantaneous, with virtually instantaneous display of the solution generated track(s) in response to the operator's adjustment of the range/bearing definition of the tie-down points and associated ranges. Thus, by manipulation of the controls, the operator can quickly make adjustments which result in a good match between the solution generated track and the actual displayed target information. In multi-sensor environments, the process allows for observation of the raster solution on multiple raster plots. This provides rapid solution generation by use of a triangulation process between the co-located and non-co-located arrays such as a bow array and a towed line array.

Figure 11:
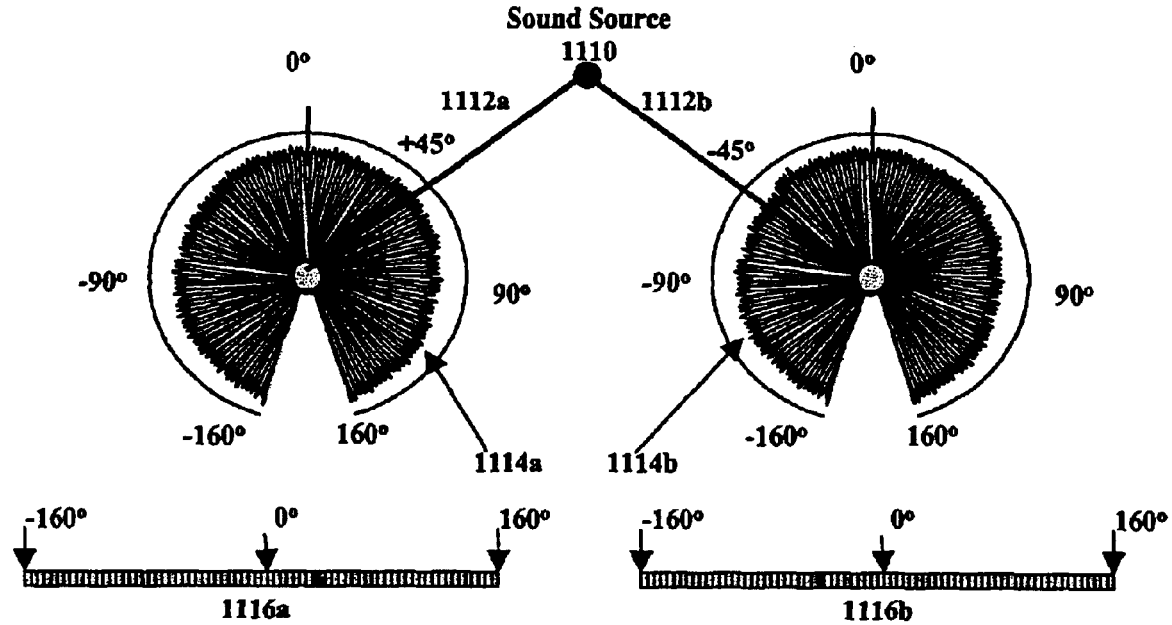
FIGS. 11 and 12 illustrate the aspects of receiving target energy by multiple sensors concurrently at the same moment in time.
Figure 12:
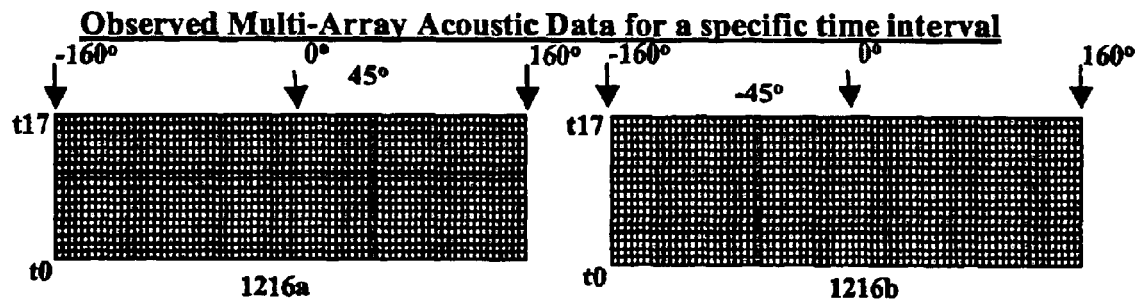

FIG. 11 is a representation illustrating how a multi-acoustic-array system can determine the location of a target by triangulation. The sensor and resulting raster line of energy data depicted in 1114a/1116a and 1114b/1116b are of the same nature as described in FIG. 8 and FIG. 9. Each line of raster information over time results is a raster plot with the target at different bearing over time (1216a and 1216b). Using the sensor's positional data with respect to the reference coordinate system and the measured energy lines an operator could determine a target's solution based upon a triangulation technique. In FIG. 11, a sound source 1110 produces or reflects energy, which flows by direct paths 1112a and 1112b to spaced-apart sensors, illustrated by their array patterns 1114a and 1114b. The energy from source 1110 arrives at array pattern 1114a at an angle of +45°, and arrives at array pattern 1114b at an angle of −45°. The instantaneous resulting display associated with array pattern 1114a is illustrated as 1116a, and that associated with array pattern 1114b is illustrated as 1116b. As may be seen in display lines 1116a and 1116b, the arrays provide indications at bearings +45° and at −45°, respectively. If the ownship is not moving and the target sound source 1110 is not moving, the display over time will be as illustrated by 1216a and 1216b of FIG. 12.

Figure 5:
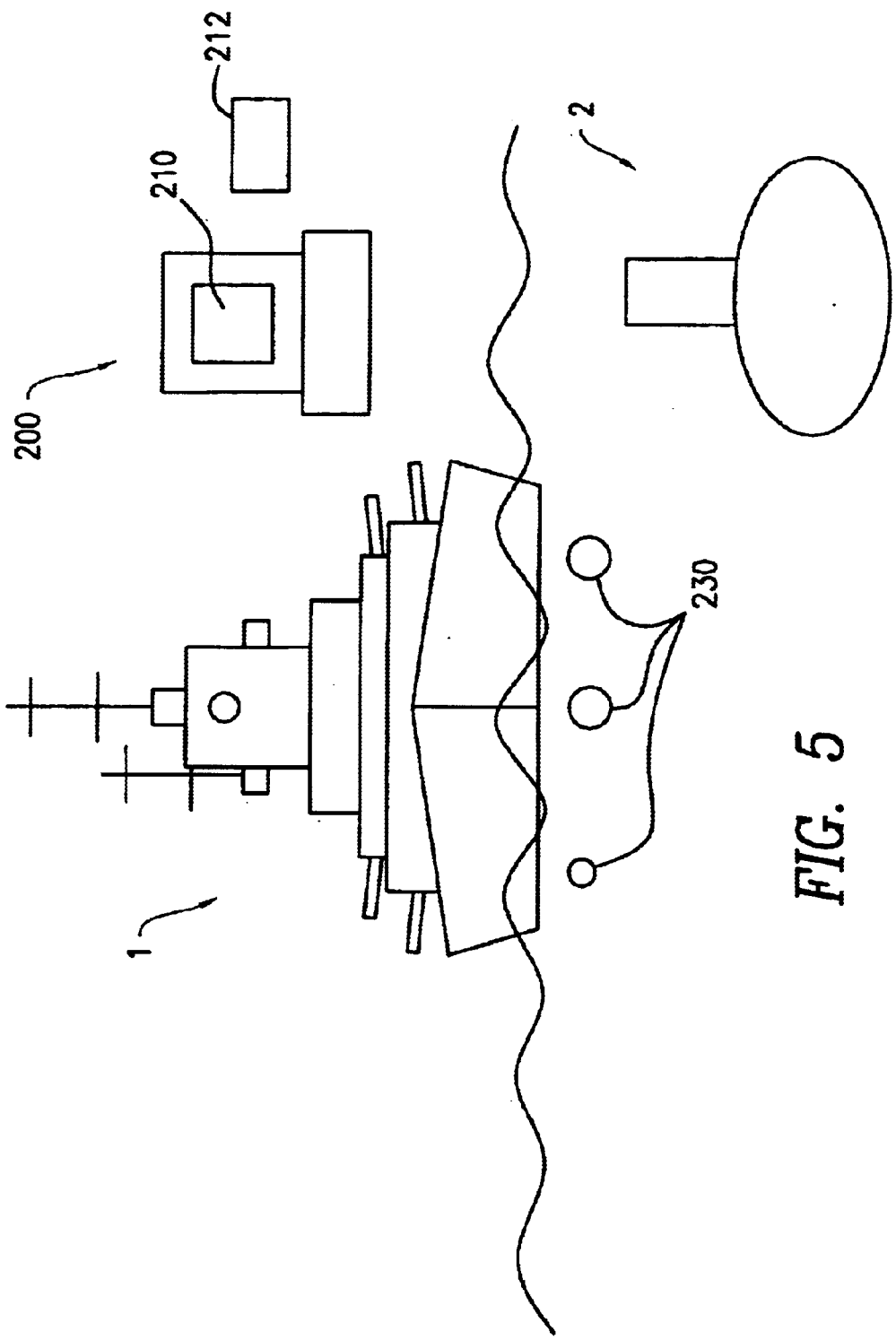
FIG. 5 illustrates a sensor platform, a sound emitting platform, a processing computer, a display surface, a storage device, and various sensors on the receiving sensor platform.

FIG. 5 is a simplified diagram illustrating an ownship 1 having a plurality of sensor arrays 230, and also having a computer 200 with a display 210 and an internal memory 200m. In a preferred embodiment, calculations and processing defined in FIGS. 6 and 7 are preferably performed by computer 200 of FIG. 5, which is programmed to carry out the functions set forth in this description and is typically accessible to ownship 1 containing the receiving system, such as by being onboard ownship 1. Computer 200 may comprise any suitable computer known in the art. Computer 200 further comprises a processor, memory, and output device as well as range, bearing and time calculation software executing within computer 200. The computer 200 may comprise a display device 210, a hard copy device 212, or the like, or a combination thereof.

Data sets comprising acoustic data may be gathered such as by using one or more sensors (shown as 230 in FIG. 5 for illustration) deployed within or near ownship 1 and capable of obtaining target information a desired location such as ownship 1 and providing measurements related to the target 2 and ownship. Sensors 230 may comprise any suitable sensors known in the art such as passive acoustic sensors. The data may be passively obtained by numerous means as will be familiar to those of ordinary skill in the passive data acquisition arts. Once gathered, these data may be stored for later processing in the memory of computer 200 or in a data collection device that is addressably in communication with the computer. The analysis performed may occur within the computer or a portion of the computer that has been programmed to analyze the data received by the sensors.

Using the target tracking and measurement calculation software, the computer may generate raster data for display on an output device such as a CRT display. The computer processor may then derive target trace data from coordinates associated with the generated raster data. A user interface enables visual comparison of the target trace data with the raster data, for example, by overlay of the target trace data with the raster data. Software enabling an operator to, adjust at least one of time, bearing and range parameters associated with the derived target trace causes the processor to update the target trace data on the output display device. In this manner, the operator can adjust or modify the solution to obtain a target trace whose differences are minimized with respect to the raster data.

The method according to an aspect of the invention provides to the operator an enhanced capability of using acoustic raster data (raw sensor beam data) to derive solutions based upon Time, Bearings/Conical Angle and Propagation path information. There by, providing to the operator the ability to rapidly acquire a target solution and observe the quality of the solution without requiring the generation of acoustic tracker data. This method significantly reduces if not eliminates the problems associated with present tracker information under specific conditions. In conventional systems, naval systems use trackers to feed data into algorithms for the algorithms to attempt to come up with a solution. The present processing processes acoustic data to obtain information coming from front end sensors, the information provided in a graphical means to rapidly come up with a solution. The present invention provides an advantageous solution in that one does not have to track that energy first to create data points and then use the data points to then feed into algorithms that then come up with solutions. Rather, the solution is generated with the raw energy coming in from the sensors.

Raster MATE is a method designed to support quick solution generation in a Close-In high bearing rate, low SNR, or high-density target environment, but may of course be used in less demanding environments. Raster MATE uses a non-traditional method to resolve the target's solution.

In the present invention, the raster has information provided with it with respect to time and sense of position and energy information. This information is utilized along with a tagged solution to obtain a visual comparison, and as the operator adjusts his tag solution parameters, the system adjusts how the solution fits with respect to the original raster data and gives outputs an overlay. The operator continues to obtain and use that feedback to get the solutions to fit on top of the raster trace. When the fit is accomplished, then the solution is obtained. In this manner, the operator need never get into any track function, as the operator never uses any tracker data. Rather, in the present invention, the operator utilizes and the system processes only the raw energy of what he sees with a cursor overlaid on top of it, doing from the viewpoint of the operator what he or she considers as simply "moving this cursor," whereby the system processes all the central information, the positional information, the information on the raster line along with the minor geometry cases the operator has done to his cursor, and applying that as a solution to come up with an actual fit on the screen.

The Raster MATE concept is designed to address many of the problem outlined above, in addition to providing advanced multi-sensor capabilities. The Raster MATE capability is capable of operating with a single sensor or with multiple sensor. These sensors could be co-located or non co-located. The ease and timely process to solution resolution excels when using multiple sensor raster data. Concurrent multi-sensor operations enable the TMA evaluator to resolve a target solution, based on Triangulation, using all possible sensor/array data. Triangulation solution generation is best supported using a co-located platform mounted sensor and a non co-located sensor, or if the target data is observed via multiple propagation paths (Direct Path and Bottom Bounce) on the sensor array.

While there has been shown, described, and pointed out, fundamental novel features of the present invention as applied to preferred embodiments thereof, it will be understood that various omissions and substitutions and changes in the method described, in form and details disclosed, an in operation, may be made by those skilled in the art without departing from the spirit of the present invention. Further, it is expressly intended that all combinations of those elements and/or method steps, which perform substantially the same function in substantially the same way to achieve the same results, be within the scope of the invention. Substitutions of elements from one described embodiment to another are also fully intended and contemplated.

Thus, a method according to an aspect of the invention is for determining location information associated with a contact based upon acoustic raster data received from at least one sensor. The method comprises the step of deriving target trace data from coordinates associated with the acoustic raster data. The derived target trace data is compared with the raster data. The derived target trace data is updated by adjusting at least one of time, bearing and range parameters associated with the derived target trace, for minimizing differences between the target trace data and the raster data.

A system according to another aspect of the invention is for determining location information associated with a contact. The system comprises a detector for detecting and processing acoustic data to generate raster data associated with a contact. A computer including a memory and a processor is responsive to the generated raster data for deriving target trace data from coordinates associated with the generated raster data. The computer includes a user interface, which enables visual comparison of the target trace data with the raster data, and also includes means for adjusting at least one of time, bearing and range parameters associated with the derived target trace to cause the processor to update the target trace data for minimizing differences between the target trace data and the raster data.

What is claimed is:

1. A method for determining location information associated with a contact based upon acoustic raster data received from at least one sensor, the method comprising the steps of:

deriving target trace data from coordinates associated with the acoustic raster data;

comparing the derived target trace data with the raster data; and updating the derived target trace data by adjusting at least one of time, bearing and range parameters associated with the derived target trace for minimizing differences between the target trace data and the raster data.

2. A system for determining location information associated with a contact, the system comprising:

a detector for detecting and processing acoustic data to generate raster data associated with a contact;

a computer having a memory and a processor responsive to the generated raster data for deriving target trace data from coordinates associated with the generated raster data, said computer having a user interface enabling visual comparison of the target trace data with the raster data, and means for adjusting at least one of time, bearing and range parameters associated with the derived target trace to cause said processor to update said target trace data for minimizing differences between the target trace data and the raster data.

3. A method for deriving a contact solution based upon raster data, said method comprising the steps of:

(a) processing received acoustic data to generate raster data associated with a contact;

(b) deriving target trace data from coordinates associated with said acoustic raster data to thereby generate derived target trace data;

(c) comparing said derived target trace data with said raster data; and (d) updating said derived target trace data by adjusting at least one of time, bearing and range parameters associated with said derived target trace, for minimizing differences between said target trace data and said raster data.

4. A system for deriving a solution on a contact, the system comprising:

a detector for processing and detecting acoustic data to generate raster data associated with a contact;
b) a computer having a memory and a processor responsive to the generated raster data for deriving target trace data from coordinates associated with the generated raster data, said computer having a user interface enabling visual comparison of the target trace data with the raster data, and means for adjusting at least one of time, bearing and range parameters associated with the derived target trace to cause said processor to update said target trace data for minimizing the differences between the target trace data and the raster data, said processor operative to provide range, bearing, course and speed on the contact based on the acoustic data.

\* \* \* \* \*

UNITED STATES PATENT AND TRADEMARK OFFICE
CERTIFICATE OF CORRECTION

| | | |
|---|---|---|
| PATENT NO. | : 6,757,219 B2 | Page 1 of 1 |
| APPLICATION NO. | : 10/627084 | |
| DATED | : June 29, 2004 | |
| INVENTOR(S) | : Victor P. Larosa and Charles G. Maniak | |

It is certified that error appears in the above-identified patent and that said Letters Patent is hereby corrected as shown below:

In the specification after the paragraph Cross-Reference To Related Applications, please insert the following paragraph:

--Government License Rights

The invention was made with U.S. government support, and the U.S. Government has certain rights in the invention, as provided by the terms of Contract number N00024-96-C-6216 awarded by the U.S. Navy--

Signed and Sealed this

First Day of July, 2008

JON W. DUDAS
*Director of the United States Patent and Trademark Office*